(12) United States Patent
Wheeler et al.

(10) Patent No.: US 7,587,728 B2
(45) Date of Patent: Sep. 8, 2009

(54) METHODS AND APPARATUS TO MONITOR RECEPTION OF PROGRAMS AND CONTENT BY BROADCAST RECEIVERS

(75) Inventors: Henry B. Wheeler, St. Petersburg, FL (US); Daozheng Lu, Dunedin, FL (US); Paul C. Kempter, Palm Harbor, FL (US); William A. Feininger, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 258 days.

(21) Appl. No.: 11/339,269

(22) Filed: Jan. 25, 2006

(65) Prior Publication Data

US 2006/0195857 A1    Aug. 31, 2006

Related U.S. Application Data

(60) Continuation of application No. 10/693,549, filed on Oct. 24, 2003, and a continuation of application No. 09/909,224, filed on Jul. 19, 2001, which is a division of application No. 09/076,517, filed on May 12, 1998, now abandoned, which is a division of application No. 08/786,270, filed on Jan. 22, 1997, now Pat. No. 6,675,383.

(51) Int. Cl.
*H04H 60/32* (2008.01)
*H04H 60/33* (2008.01)

(52) U.S. Cl. .............................. 725/19; 725/9; 725/14; 725/20

(58) Field of Classification Search ................... 725/19, 725/20
See application file for complete search history.

(56) References Cited

U.S. PATENT DOCUMENTS 3,372,233 A    3/1968    Currey
(Continued)

FOREIGN PATENT DOCUMENTS

EP    0161512    11/1985
(Continued)

OTHER PUBLICATIONS

Advanced Television Systems Committee. "Program and System Information Protocol For Terrestrial Broadcast and Cable (Revision A) and Amendment No. 1. Doc. A/65A" May 31, 2000.
(Continued)

*Primary Examiner*—Christopher Kelley
*Assistant Examiner*—Justin E Shepard
(74) *Attorney, Agent, or Firm*—Hanley, Flight & Zimmerman, LLC

(57) ABSTRACT

Methods and apparatus to monitor reception of programs and content by broadcast receivers are disclosed. An example method disclosed herein to monitor reception of a broadcast program by a broadcast receiver located in a statistically selected site comprises retrieving an audience measurement data packet from the broadcast receiver in order to identify the broadcast program, detecting a code embedded in the broadcast program in order to identify the broadcast program, extracting a signature from the broadcast program in order to identify the broadcast program, identifying the broadcast program through use of a software agent, and selecting at least one of the audience measurement data packet, the embedded code, the extracted signature or the software agent to identify the received program.

40 Claims, 11 Drawing Sheets

U.S. PATENT DOCUMENTS

| | | | |
|---|---|---|---|
| 3,845,391 A | 10/1974 | Crosby | 325/64 |
| 3,919,479 A | 11/1975 | Moon et al. | 179/1 |
| 4,025,851 A | 5/1977 | Haselwood et al. | 325/31 |
| 4,027,332 A * | 5/1977 | Wu et al. | 725/15 |
| 4,547,804 A | 10/1985 | Greenberg | |
| 4,574,304 A | 3/1986 | Watanabe et al. | |
| 4,599,644 A * | 7/1986 | Fischer | 725/21 |
| 4,622,583 A | 11/1986 | Watanabe et al. | 358/84 |
| 4,633,302 A | 12/1986 | Damoci | 358/84 |
| 4,639,779 A | 1/1987 | Greenberg | 358/142 |
| 4,644,509 A | 2/1987 | Kiewit et al. | |
| 4,647,974 A | 3/1987 | Butler et al. | |
| 4,677,466 A | 6/1987 | Lert, Jr. et al. | |
| 4,697,209 A | 9/1987 | Kiewit et al. | 358/84 |
| 4,718,106 A | 1/1988 | Weinblatt | 455/2 |
| 4,739,398 A | 4/1988 | Thomas et al. | |
| 4,750,034 A | 6/1988 | Lem | |
| 4,764,808 A | 8/1988 | Solar | 358/84 |
| 4,792,864 A | 12/1988 | Watanabe et al. | |
| 4,816,904 A | 3/1989 | McKenna et al. | |
| 4,839,919 A | 6/1989 | Borges et al. | |
| 4,843,562 A | 6/1989 | Kenyon et al. | |
| 4,847,685 A | 7/1989 | Gall | 358/84 |
| 4,858,000 A | 8/1989 | Lu | |
| 4,876,617 A | 10/1989 | Best et al. | |
| 4,931,871 A | 6/1990 | Kramer | |
| 4,945,412 A | 7/1990 | Kramer | |
| 4,955,070 A | 9/1990 | Welsh et al. | 455/2 |
| 4,965,825 A | 10/1990 | Harvey et al. | |
| 4,972,503 A | 11/1990 | Zurlinden | |
| 5,003,591 A | 3/1991 | Kauffman et al. | |
| 5,019,899 A | 5/1991 | Boles et al. | |
| 5,023,929 A | 6/1991 | Call | |
| 5,113,437 A | 5/1992 | Best et al. | |
| 5,138,659 A | 8/1992 | Kelkar et al. | |
| 5,155,762 A | 10/1992 | Croquet et al. | |
| 5,165,069 A | 11/1992 | Vitt et al. | 358/335 |
| 5,200,822 A | 4/1993 | Bronfin et al. | |
| 5,251,324 A | 10/1993 | McMullan, Jr. | |
| 5,278,988 A | 1/1994 | Dejean et al. | |
| 5,294,977 A | 3/1994 | Fisher et al. | 348/4 |
| 5,319,453 A | 6/1994 | Copriviza et al. | |
| 5,369,440 A | 11/1994 | Sussman | |
| 5,373,315 A | 12/1994 | Dufresne et al. | |
| 5,374,951 A | 12/1994 | Welsh | |
| 5,379,345 A | 1/1995 | Greenberg | |
| 5,404,160 A | 4/1995 | Schober et al. | |
| 5,404,161 A * | 4/1995 | Douglass et al. | 725/15 |
| 5,404,377 A | 4/1995 | Moses | |
| 5,425,100 A | 6/1995 | Thomas et al. | 380/20 |
| 5,436,653 A | 7/1995 | Ellis et al. | |
| 5,437,050 A | 7/1995 | Lamb et al. | |
| 5,450,122 A | 9/1995 | Keene | |
| 5,450,490 A | 9/1995 | Jensen et al. | |
| 5,457,807 A * | 10/1995 | Weinblatt | 455/2.01 |
| 5,481,294 A | 1/1996 | Thomas et al. | 348/1 |
| 5,485,518 A * | 1/1996 | Hunter et al. | 725/28 |
| 5,488,408 A | 1/1996 | Maduzia et al. | 348/2 |
| 5,490,060 A | 2/1996 | Malec et al. | |
| 5,495,282 A | 2/1996 | Mostafa et al. | 348/5 |
| 5,497,185 A | 3/1996 | Dufresne et al. | |
| 5,504,518 A | 4/1996 | Ellis et al. | |
| 5,512,933 A * | 4/1996 | Wheatley et al. | 725/19 |
| 5,526,427 A | 6/1996 | Thomas et al. | 380/20 |
| 5,532,732 A | 7/1996 | Yuen et al. | |
| 5,559,549 A | 9/1996 | Hendricks et al. | |
| 5,572,246 A | 11/1996 | Ellis et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,583,784 A | 12/1996 | Kapust et al. | |
| 5,594,934 A | 1/1997 | Lu et al. | |
| 5,600,364 A | 2/1997 | Hendricks et al. | |
| 5,608,445 A | 3/1997 | Mischler | |
| 5,612,729 A | 3/1997 | Ellis et al. | |
| 5,621,454 A | 4/1997 | Ellis et al. | |
| 5,629,739 A | 5/1997 | Dougherty | |
| 5,630,203 A | 5/1997 | Weinblatt | |
| 5,646,675 A | 7/1997 | Copriviza et al. | |
| 5,654,748 A | 8/1997 | Matthews, III | |
| 5,659,350 A | 8/1997 | Hendricks et al. | |
| 5,675,510 A | 10/1997 | Coffey et al. | |
| 5,676,282 A | 10/1997 | Satterfield | |
| 5,701,582 A | 12/1997 | DeBey | 455/5.1 |
| 5,726,701 A | 3/1998 | Needham | |
| 5,734,444 A * | 3/1998 | Yoshinobu | 725/14 |
| 5,737,025 A | 4/1998 | Dougherty et al. | |
| 5,757,414 A | 5/1998 | Thorne | |
| 5,764,763 A | 6/1998 | Jensen et al. | |
| 5,768,680 A | 6/1998 | Thomas | |
| 5,771,307 A | 6/1998 | Lu et al. | |
| 5,787,334 A | 7/1998 | Fardeau et al. | |
| 5,793,414 A | 8/1998 | Shaffer | 348/13 |
| 5,796,952 A | 8/1998 | Davis et al. | |
| 5,798,785 A | 8/1998 | Hendricks et al. | |
| 5,815,297 A | 9/1998 | Ciciora | 398/112 |
| 5,819,156 A | 10/1998 | Belmont | |
| 5,826,164 A | 10/1998 | Weinblatt | |
| 5,842,010 A | 11/1998 | Jain et al. | |
| 5,848,396 A | 12/1998 | Gerace | |
| 5,850,249 A | 12/1998 | Massetti et al. | |
| 5,857,190 A | 1/1999 | Brown | |
| 5,872,588 A | 2/1999 | Aras et al. | |
| 5,880,789 A | 3/1999 | Inaba | |
| 5,881,360 A | 3/1999 | Fong | |
| 5,889,548 A | 3/1999 | Chan | |
| 5,905,865 A | 5/1999 | Palmer et al. | |
| 5,910,988 A | 6/1999 | Ballard | 705/75 |
| 5,914,746 A * | 6/1999 | Matthews et al. | 725/132 |
| 5,963,914 A | 10/1999 | Skinner et al. | |
| 5,973,625 A | 10/1999 | Nam | 341/50 |
| 5,973,750 A | 10/1999 | Ogawa et al. | |
| 5,974,299 A | 10/1999 | Massetti | 455/2 |
| 6,031,577 A | 2/2000 | Ozkan et al. | 348/465 |
| 6,085,066 A | 7/2000 | Fong | |
| 6,112,053 A | 8/2000 | Dunki-Jacobs et al. | |
| 6,118,873 A | 9/2000 | Lotspiech et al. | 380/277 |
| 6,124,877 A | 9/2000 | Schmidt | |
| 6,130,726 A | 10/2000 | Darbee et al. | |
| 6,160,570 A | 12/2000 | Sitnik | |
| 6,169,843 B1 | 1/2001 | Lenihan et al. | 386/46 |
| 6,184,918 B1 | 2/2001 | Goldschmidt Iki et al. | |
| 6,202,210 B1 | 3/2001 | Ludtke | |
| 6,259,443 B1 | 7/2001 | Williams, Jr. | 715/741 |
| 6,286,140 B1 | 9/2001 | Ivanyi | 725/20 |
| 6,353,929 B1 | 3/2002 | Houston | |
| 6,421,445 B1 | 7/2002 | Jensen et al. | |
| 6,473,903 B2 * | 10/2002 | Balakrishnan et al. | 725/135 |
| 6,510,557 B1 | 1/2003 | Thrift | 725/110 |
| 6,512,796 B1 | 1/2003 | Sherwood | |
| 6,513,161 B2 | 1/2003 | Wheeler et al. | |
| 6,647,548 B1 | 11/2003 | Lu et al. | |
| 6,675,383 B1 | 1/2004 | Wheeler et al. | |
| 6,735,775 B1 | 5/2004 | Massetti | |
| 6,738,978 B1 | 5/2004 | Hendricks et al. | |
| 6,751,221 B1 | 6/2004 | Saito et al. | 370/392 |
| 7,316,025 B1 | 1/2008 | Aijala et al. | |
| 7,454,776 B1 | 11/2008 | Walker et al. | |
| 2004/0088721 A1 | 5/2004 | Wheeler et al. | |

FOREIGN PATENT DOCUMENTS

| | | |
|---|---|---|
| EP | 0 195 639 A2 | 3/1986 |
| EP | 0195639 | 9/1986 |

| | | |
|---|---|---|
| EP | 0210609 | 2/1987 |
| EP | 0245037 | 11/1987 |
| EP | 0283570 | 9/1988 |
| EP | 0598398 | 5/1994 |
| EP | 0 687 083 | 12/1995 |
| EP | 0703683 | 3/1996 |
| EP | 0985287 | 3/2000 |
| FR | 2 555 383 | 5/1985 |
| FR | 2 717 025 | 9/1995 |
| GB | 2170080(A) | 7/1986 |
| JP | 63084396 | 4/1988 |
| JP | 1177796 | 7/1989 |
| JP | 5327639 | 12/1993 |
| JP | 7255069 | 10/1995 |
| JP | 8508617 | 9/1996 |
| JP | 11275032 | 10/1999 |
| KR | 930006665 | 7/1993 |
| WO | 8810540 | 12/1988 |
| WO | WO 91/11062 | 7/1991 |
| WO | 9322875 | 11/1993 |
| WO | WO 94/11989 | 5/1994 |
| WO | 9512278 | 5/1995 |
| WO | WO 95/15653 | 6/1995 |
| WO | 9641495 | 12/1996 |
| WO | 9831155 | 7/1998 |
| WO | 9959275 | 11/1999 |
| WO | 9962260 | 12/1999 |
| WO | 0004662 | 1/2000 |
| WO | 0016552 | 3/2000 |

OTHER PUBLICATIONS

Advanced Television Systems Committee T3/S8 Transport Specialist Group. "Annex G—An Overview of PSIP For Cable." ATSC T3/S8 Doc. 268. Apr. 3, 1998.

Advanced Television Systems Committee. "Guide to the Use of the ATSC Digital Television Standard." pp. 1-148 (2003).

Advanced Television Systems Committee. "Program/Episode/Version Identification. ATSC Standard." Doc. A/57. Aug. 30, 1996.

European Patent Office. *Communication Pursuant to Article 115(2) EPC* for European Patent Application No. 00114272.8, with attached Observation of third party (Aug. 14, 2003).

European Patent Office, European Search Report, date of completion Oct. 3, 2000, Application No. EP 00 11 4271.

European Patent Office, European Search Report, date of completion Oct. 5, 2000, Application No. EP 00 11 4272.

International Search Report, dated Jul. 1, 1999, Application No. PCT/US98/14286.

V. Balabanian et al. An Introduction To Digital Storage Media—Command and Control (DSM-CC). IEEE Communications Magazine, Nov. 1996.

Video Research, Ltd., "English language translation of Information Statement," submitted with the Japanese Office in connection with Japanese Patent Application Serial No. 2000-548980, on May 25, 2007 (8 pages).

United States Patent and Trademark Office, "Status Letter Reply," issued in connection with U.S. Appl. No. 08/786,270, on Apr. 30, 1998 (2 pages).

United States Patent and Trademark Office, "Non-Final Office Action," issued in connection with U.S. Appl. No. 08/786,270, on Jun. 16, 1999 (5 pages).

United States Patent and Trademark Office, "Non-Final Office Action," issued in connection with U.S. Appl. No. 08/786,270, on Jul. 28, 1999 (11 pages).

United States Patent and Trademark Office, "Non-Final Office Action," issued in connection with U.S. Appl. No. 08/786,270, on Jan. 20, 2000 (11 pages).

United States Patent and Trademark Office, "Final Office Action," issued in connection with U.S. Appl. No. 08/786,270, on Sep. 5, 2000 (8 pages).

United States Patent and Trademark Office, "Advisory Action," issued in connection with U.S. Appl. No. 08/786,270, on Dec. 11, 2000 (1 page).

United States Patent and Trademark Office, "Non-Final Office Action," issued in connection with U.S. Appl. No. 08/786,270, on Jun. 16, 1999 (5 pages).

United States Patent and Trademark Office, "Examiner's Communication," issued in connection with U.S. Appl. No. 08/786,270, on Jul. 10, 2001 (2 pages).

United States Patent and Trademark Office, "Decision on Appeal," issued in connection with U.S. Appl. No. 08/786,270, on Mar. 31, 2003 (18 pages).

United States Patent and Trademark Office, "Notice of Allowance," issued in connection with U.S. Appl. No. 08/786,270, on Jul. 28, 2003 (5 pages).

United States Patent and Trademark Office, "Non-Final Office Action," issued in connection with U.S. Appl. No. 09/859,764, on May 22, 2002 (8 pages).

United States Patent and Trademark Office, "Notice of Allowance," issued in connection with U.S. Appl. No. 09/859,764, on Sep. 3, 2002 (4 pages).

United States Patent and Trademark Office, "Non-Final Office Action," issued in connection with U.S. Appl. No. 09/076,517, on Mar. 5, 2002 (14 pages).

United States Patent and Trademark Office, "Non-Final Office Action," issued in connection with U.S. Appl. No. 09/076,517, on Nov. 19, 2002 (11 pages).

United States Patent and Trademark Office, "Final Office Action," issued in connection with U.S. Appl. No. 09/076,517, on Aug. 11, 2003 (14 pages).

United States Patent and Trademark Office, "Final Office Action," issued in connection with U.S. Appl. No. 09/076,517, on Mar. 11, 2004 (17 pages).

United States Patent and Trademark Office, "Examiner's Answer in response to the Appeal Brief filed Apr. 13, 2005," issued in connection with U.S. Appl. No. 09/076,517, on Nov. 2, 2005 (14 pages).

United States Patent and Trademark Office, "Decision on Appeal," issued in connection with U.S. Appl. No. 09/076,517, on Sep. 26, 2006 (12 pages).

United States Patent and Trademark Office, "Notice of Abandonment," issued in connection with U.S. Appl. No. 09/076,517, on Dec. 6, 2006 (2 pages).

United States Patent and Trademark Office, "Non-Final Office Action," issued in connection with U.S. Appl. No. 09/909,224, on Oct. 19, 2005 (24 pages).

United States Patent and Trademark Office, "Final Office Action," issued in connection with U.S. Appl. No. 09/909,224, on Jun. 15, 2006 (21 pages).

United States Patent and Trademark Office, "Non-Final Office Action," issued in connection with U.S. Appl. No. 09/909,224, on Mar. 22, 2007 (23 pages).

United States Patent and Trademark Office, "Final Office Action," issued in connection with U.S. Appl. No. 09/909,224, on Aug. 1, 2007 (24 pages).

United States Patent and Trademark Office, "Non-Final Office Action," issued in connection with U.S. Appl. No. 09/909,224, on Feb. 6, 2009 (27 pages).

United States Patent and Trademark Office, "Election/Restrictions Requirement," issued in connection with U.S. Appl. No. 10/693,549, on Nov. 13, 2008 (6 pages).

United States Patent and Trademark Office, "Non-Final Office Action," issued in connection with U.S. Appl. No. 10/693,549, on Apr. 1, 2009 (12 pages).

United States Patent and Trademark Office, "Non-Final Office Action," issued in connection with U.S. Appl. No. 09/949,938, on Oct. 24, 2002 (11 pages).

United States Patent and Trademark Office, "Non-Final Office Action," issued in connection with U.S. Appl. No. 09/949,938, on May 9, 2003 (8 pages).

United States Patent and Trademark Office, "Final Office Action," issued in connection with U.S. Appl. No. 09/949,938, on Nov. 7, 2003 (11 pages).

United States Patent and Trademark Office, "Non-Final Office Action," issued in connection with U.S. Appl. No. 11/595,117, on Nov. 25, 2008 (7 pages).

Patent Cooperation Treaty, "International Search Report," issued by the International Searching Authority in connection with PCT application No. PCT/US1994/011795, mailed Feb. 24, 1995 (1 page).
Patent Cooperation Treaty, "International Search Report," issued by the International Searching Authority in connection with PCT application No. PCT/US1997/009218, mailed Jan. 26, 1998 (4 pages).
Patent Cooperation Treaty, "Written Opinion," issued by the International Searching Authority in connection with PCT application No. PCT/US1997/009218, mailed Mar. 8, 1999 (6 pages).
Patent Cooperation Treaty, "International Preliminary Examination Report," issued by the International Preliminary Examining Authority in connection with PCT application No. PCT/US1997/009218, mailed Apr. 21, 1999 (11 pages).
Patent Cooperation Treaty, "International Search Report," issued by the International Searching Authority in connection wth PCT application No. PCT/US1998/023558, mailed Aug. 27, 1999 (4 pages).
Patent Cooperation Treaty, "International Search Report," issued by the International Searching Authority in connection with PCT application No. PCT/US2000/003829, mailed Aug. 18, 2000 (3 pages).
Australian Intellectual Property Office, "Examiner's First Report," issued in connection with Australian Patent Application Serial No. 31489/97, on Mar. 2, 2000 (1 page).
Australian Intellectual Property Office, "Examiner's Second Report," issued in connection with Australian Patent Application Serial No. 31489/97, on Mar. 21, 2001 (1 page).
Australian Intellectual Property Office, "Notice of Acceptance," issued in connection with Australian Patent Application Serial No. 31489/97, on May 30, 2001 (2 pages).
Australian Intellectual Property Office, "Examiner's First Report," issued in connection with Australian Patent Application Serial No. 2003262297, on Jul. 6, 2005 (2 pages).
Australian Intellectual Property Office, "Examiner's First Report," issued in connection with Australian Patent Application Serial No. 46028/01, on Jun. 13, 2002 (1 page).
Australian Intellectual Property Office, "Notice of Acceptance," issued in connection with Australian Patent Application Serial No. 57828/01, on Dec. 3, 2002 (2 pages).
Australian Intellectual Property Office, "Notice of Acceptance," issued in connection with Australian Patent Application Serial No. 57833/01, on Dec. 3, 2002 (2 pages).
Australian Intellectual Property Office, "Examiner's First Report," issued in connection with Australian Patent Application Serial No. 82980/98, on Jul. 24, 2000 (2 pages).
"The Claims Defining the Invention," which were allowed in connection with Australian Patent Application Serial No. 57830/01, Dec. 3, 2002 (4 pages).
Australian Intellectual Property Office, "Notice of Acceptance," issued in connection with Australian Patent Application Serial No. 57830/01, on Dec. 3, 2002 (2 pages).
"The Claims Defining the Invention," which were allowed in connection with Australian Patent Application Serial No. 57831/01, Sep. 9, 2003 (1 page).
Australian Intellectual Property Office, "Notice of Acceptance," issued in connection with Australian Patent Application Serial No. 57831/01, on Sep. 9, 2003 (2 pages).
Australian Intellectual Property Office, "Notice of Acceptance," issued in connection with Australian Patent Application Serial No. 57832/01, on Oct. 27, 2003 (2 pages).
"The Claims Defining the Invention," which were allowed in connection with Australian Patent Application Serial No. 57832/01, Oct. 27, 2003 (2 pages).
Canadian Intellectual Property Office, "Notification of a Requisition by the Examiner," issued in connection with Canadian Patent Application Serial No. 2,275,409, on May 10, 2004 (3 pages).
Canadian Intellectual Property Office, "Notification of a Requisition by the Examiner," issued in connection with Canadian Patent Application Serial No. 2,275,409, on Jan. 6, 2005 (2 pages).
Canadian Intellectual Property Office, "Notification of a Requisition by the Examiner," issued in connection wih Canadian Patent Application Serial No. 2,275,409, on May 10, 2004 (3 pages).
Canadian Intellectual Property Office, "Notice of Allowance," issued in connection with Canadian Patent Application Serial No. 2,275,409, Oct. 11, 2005 (1 page).
Canadian Intellectual Property Office, "Notification of a Requisition by the Examiner," issued in connection with Canadian Patent Application Serial No. 2,289,519, on Feb. 9, 2000 (3 pages).
Canadian Intellectual Property Office, "Notification of a Requisition by the Examiner," issued in connection with Canadian Patent Application Serial No. 2,289,519, on Jun. 16, 2000 (2 pages).
English language translation of the, "First Office Action," issued by The State Intellectual Property Office of China in connection with Chinese Patent Application Serial No. 97181455.4, on Jun. 7, 2002 (6 pages).
The State Intellectual Property Office of China, "Second Office Action," issued in connection with Chinese Patent Application Serial No. 97181455.4, on Apr. 25, 2003, with its English language translation (9 pages).
The State Intellectual Property Office of China, "Notice of Decision of Granting Patent Right for Invention," issued in connection with Chinese Patent Application Serial No. 97181455.4, on May 21, 2004, with its English language translation (4 pages).
English Language Translation of the Granted Claims in connection with Chinese Patent Application Serial No. 98806840.0, Oct. 17, 2003 (5 pages).
The State Intellectual Property Office of China, "First Office Action," issued in connection with Chinese Patent Application Serial No. 98806840.0, on Oct. 25, 2002, with its English language translation (11 pages).
The State Intellectual Property Office of China, "Notice of Grant of Patent Rights to Invention," issued in connection with Chinese Patent Application Serial No. 98806840.0, on Oct. 17, 2003, with its English language translation (4 pages).
The State Intellectual Property Office of China, "Second Office Action," issued in connection with Chinese Patent Application Serial No. 98806840.0, on Apr. 25, 2003, with its English language translation (7 pages).
The State Intellectual Property Office of China, "First Office Action," issued in connection with Chinese Patent Application Serial No. 200310123387.1, on Dec. 8, 2006, with its English language translation (8 pages).
The State Intellectual Property Office of China, "Second Office Action," issued in connection with Chinese Patent Application Serial No. 200310123387.1, on Aug. 3, 2007, with its English language translation (7 pages).
The State Intellectual Property Office of China, "Rejection Decision," issued in connection with Chinese Patent Application Serial No. 200310123387.1, on Apr. 4, 2008, with its English language translation (7 pages).
European Patent Office, "Communication Pursuant to Article 96(2) and Rule 51(2) EPC," issued in connection with European Patent Application Serial No. 98 933 309.1, on Mar. 15, 2000 (4 pages).
European Patent Office, "Communication Pursuant to Article 96(2) EPC," issued in connection with European Patent Application Serial No. 98 933 309.1, on Sep. 14, 2000 (4 pages).
European Patent Office, "Communication Pursuant to Article 96(2) EPC," issued in connection with European Patent Application Serial No. 98 933 309.1, on Apr. 23, 2001 (5 pages).
European Patent Office, "Communication Pursuant to Article 96(2) EPC," issued in connection with European Patent Application Serial No. 98 933 309.1, on Sep. 13, 2001 (3 pages).
European Patent Office, "Communication Pursuant to Article 96(2) EPC," issued in connection with European Patent Application Serial No. 98 933 309.1, on Jan. 7, 2003 (6 pages).
European Patent Office, "Summons to Attend Oral Proceedings Pursuant to Rule 71(1) EPC," issued in connection with European Patent Application Serial No. 98 933 309.1, on Mar. 12, 2004 (7 pages).
European Patent Office, "Communication Under Rule 51(4) EPC," issued in connection with European Patent Application Serial No. 98 933 309.1, on Nov. 17, 2004 (11 pages).
European Patent Office, "Communication Pursuant to Article 96(2) EPC," issued in connection with European Patent Application Serial No. 00 114 271.0, on Sep. 13, 2001 (4 pages).
European Patent Office, "Communication Pursuant to Article 96(2) EPC," issued in connection with European Patent Application Serial No. 00 114 271.0, on Jan. 7, 2003 (4 pages).

European Patent Office, "Summons to Attend Oral Proceedings Pursuant to Rule 71(1) EPC," issued in connection with European Patent Application Serial No. 00 114 271.0, on Mar. 11, 2004 (6 pages).

European Patent Office, "Provision of a Copy of the Minutes in Accordance with Rule 76(4) EPC," issued in connection with European Patent Application Serial No. 00 114 271.0, on Nov. 10, 2004 (7 pages).

European Patent Office, "Communication Under Rule 51(4) EPC," issued in connection with European Patent Application Serial No. 00 114 271.0, on Nov. 24, 2004 (4 pages).

European Patent Office, "Annexure of Communication Under Rule 51(4) EPC," issued in connection with European Patent Application Serial No. 00 114 271.0, on Nov. 24, 2004 (6 pages).

European Patent Office, "Decision to Grant a European Patent Pursuant to Article 97(2) EPC," issued in connection with European Patent Application Serial No. 00 114 271.0, on Apr. 21, 2005 (1 page).

European Patent Office, "Communication Pursuant to Article 96(2) EPC," issued in connection with European Patent Application Serial No. 00 114 272.8, on Jul. 3, 2001 (3 pages).

European Patent Office, "Communication Pursuant to Article 96(2) EPC," issued in connection with European Patent Application Serial No. 00 114 272.8, on Nov. 28, 2002 (3 pages).

European Patent Office, "Communication Pursuant to Article 115(2) EPC," issued in connection with European Patent Application Serial No. 00 114 272.8, on Aug. 14, 2003 (16 pages).

European Patent Office, "Communication Pursuant to Article 96(2) EPC," issued in connection with European Patent Application Serial No. 00 114 272.8, on Jun. 28, 2004 (4 pages).

European Patent Office, "Adjournment of Examination/Opposition Proceedings," issued in connection with European Patent Application Serial No. 00 114 272.8, on Apr. 11, 2006 (1 page).

European Patent Office, "Communication Under Rule 51(4) EPC," issued in connection with European Patent Application Serial No. 00 114 272.8, on Mar. 15, 2007 (4 pages).

European Patent Office, "Extended European Search Report," issued in connection with European Patent Application Serial No. 07017129.3, on Apr. 9, 2009 (10 pages).

Indian Patent Office, "First Examination Report," issued in connection with Indian Patent Application Serial No. 1812/MAS/98, on Dec. 30, 2004 (3 pages).

Japanese Patent Office, "Office Action (Notice of Grounds for Rejection)," issued in connection with Japanese Patent Application Serial No. Hei 10-534297, on May 13, 2003, with its English language translation (6 pages).

Japanese Patent Office, "Decision of Rejection," issued in connection with Japanese Patent Application Serial No. Hei 10-534297, on Sep. 30, 2003, with its English language translation (3 pages).

Japanese Patent Office, "Office Action (Notice of Grounds for Rejection)," issued in connection with Japanese Patent Application Serial No. 2003-292746, on Mar. 22, 2005, with its English language translation (9 pages).

Japanese Patent Office, "Final Rejection," issued in connection with Japanese Patent Application Serial No. 2003-292746, on Mar. 22, 2005, with its English language translation (3 pages).

Japanese Patent Office, "Office Action (Notice of Grounds of Rejection)," issued in connection with Japanese Patent Application Serial No. 2000-548980, on Apr. 8, 2008, with its English language translation (6 pages).

English Language Translation of the Allowed Claims for Japanese Patent Application Serial No. 2000-548980, dated Mar. 24, 2009 (4 pages).

Japanese Patent Office, "Notice regarding Submission of Prior Art Document by an Anonymous Third Party on May 25, 2007," issued in connection with Japanese Patent Application Serial No. 2000-548980 (3 page).

English Language Translation of the Notice of Allowance issued by the Japanese Patent Office in connection with Japanese Patent Application Serial No. 2000-548980, on Mar. 10, 2009 (2 pages).

English Language Translation of the First Office Action issued by the Mexican Patent Office, in connection with Mexican Patent Application Serial No. PA/a/2004/008118, dated Jul. 2, 2007 (1 page).

English Language Translation of the Second Office Action issued by the Mexican Patent Office, in connection with Mexican Patent Application Serial No. PA/a/2004/008118, dated Jan. 2, 2008 (1 page).

BBM, "Matching Pictures, Matching Expectations; The BBM PMT Validation Study Executive Summary Report," Vancouver, Canada, Feb. 9, 1998 (10 pages).

Purdye et al., "Matching Pictures, Matching Expectations; The BBM Validation Test of TN-AGB's Picture Matching Technology," conducted in Vancouver, Canada, 1998 (11 pages).

Cook et al., "Metering Television in the Digital Age" (4 pages).

BBM, "The M Files," The Department of Intergalactic Audience Measurement, Canada (2 pages).

SCTE DVS 136, "An Overview of PSIP for Cable," ATSC T3/S8 Doc. 268, issued on Apr. 3, 1998 (5 pages).

Audio Media, "Digital Audio Watermarking," Jan. 1998 (4 pages).

Namba et al., "A Program Identification Code Transmission System Using Low-Frequency Audio Signals," NHK Science and Technical Research Laboratories, Tokyo, Japan, Mar. 1985 (14 pages).

Steele et al., "Simultaneous Transmission of Speech and Data Using Code-Breaking Techniques," pp. 2061-2105, vol. 60, No. 9, The Bell System Technical Journal, American Telephone and Telegraph Company, issued in Nov. 1981 (25 pages).

* cited by examiner

| VCR Operation | Is erase signal present? | Do outputs from VCR & tuner match? | Do outputs from VCR & TV probe match? | Signal to use |
|---|---|---|---|---|
| Record (& view at same time) | Yes | Match | Match | VCR outputs |
| Record (not viewed during recording) | Yes | Match | No match | Both VCR outputs 54, 56 and scanned tuner output 67 |
| Play | No | No match | Match | VCR outputs 54, 56 |
| Tune w. VCR, or use fast forward or rewind functions | No | Match | Match | VCR outputs 54, 56 |
| OFF or TV mode | No | No match | No match | Scanned tuner output 67 |

FIG. 4

METHODS AND APPARATUS TO MONITOR RECEPTION OF PROGRAMS AND CONTENT BY BROADCAST RECEIVERS

RELATED APPLICATIONS

This patent arises from (1) a continuation of U.S. application Ser. No. 10/693,549, filed Oct. 24, 2003, which is a divisional application of U.S. application Ser. No. 08/786,270, now U.S. Pat. No. 6,675,383, filed Jan. 22, 1997, and (2) a continuation of U.S. application Ser. No. 09/909,224, filed Jul. 19, 2001, which is a divisional application of U.S. application Ser. No. 09/076,517, filed May 12, 1998 now abandoned. U.S. application Ser. No. 10/693,549 and U.S. application Ser. No. 09/909,224 are hereby incorporated by reference in their entirety.

FIELD OF THE DISCLOSURE

This disclosure relates generally to the field of audience research and, more particularly, to the detection of the viewing of television signals originating from a signal source within a statistically sampled household, the measurement of audiences of digitally broadcast television programming and the measurement of usage of other information services provided to the audiences.

BACKGROUND

As disclosed by Thomas, et al., in U.S. Pat. No. 5,481,294, which is assigned to the same assignee as the present invention and the disclosure of which is herein incorporated by reference, the signal (e.g., television or radio), that has been selected, and is being viewed or heard, by an audience member on a television or radio receiver in a statistically selected household, may be determined by ascertaining the channel to which the tuner of the television or radio is tuned. This channel information is stored locally for subsequent retrieval by a central data collection office. The central data collection office matches the retrieved channel information against a cable/station record which indicates which station corresponds to which channel and/or against a program record list of television or radio programs which were transmitted on that channel in order to determine the television or radio program that the audience member selected. As noted in U.S. Pat. No. 5,481,294 by Thomas, et al., this process becomes cumbersome as the number of signal sources, the number of channels, the changes to channel mappings at a cable head-end, and/or the number of television or radio programs increase, and can fail to produce usable data if there is an error in the program record list that provides the concordance between channels and programs.

Several approaches have been proposed that are intended to avoid the cumbersome cable/station record and/or program record list manner of keeping track of which station and/or which programming is available from which signal source and channel within a sampled household. As an example, one such approach to measuring the usage of electronic entertainment equipment (commonly called "tuning" data) involves the addition of an identifying code to a radio or television program, the distribution of the identifying code with the program throughout the relevant broadcasting system, the detection and interpretation of the identifying code when the broadcast signal is viewed or heard in a statistically selected monitoring site, and using the identifying (or ancillary) code to identify the program to which the television or radio was tuned. An example of a system which implements this type of measurement approach may be found in the following patents: U.S. Pat. No. 5,481,294 to Thomas, et al., who describe, inter alia, identifying codes added to the vertical blanking interval of an NTSC television broadcast; U.S. Pat. No. 5,629,739 to Dougherty, who is particularly concerned with the addition of an identifying code to a low energy portion of the audio spectrum of an NTSC signal; and U.S. Pat. No. 5,404,377 to Moses, who teaches an audio encoding arrangement using signal masking to decrease the perceptibility of the identifying code. The disclosures of U.S. Pat. No. 5,481,294, U.S. Pat. No. 5,629,739, and U.S. Pat. No. 5,404,377 are herein incorporated by reference.

As another example, a program signature is extracted from the program signal selected for use (e.g., for viewing if the signal is a television signal or for listening if the signal is a radio signal) in the sampled household and is later compared to previously extracted reference signatures in an effort to match the program signature to a previously extracted reference signature in order to thereby identify the selected program. Accordingly, this signature approach is a correlation system which uses a sample frequency that is less than the frequency of the program signal. For example, such an approach to measuring usage of electronic entertainment equipment involves the extraction of a characteristic feature signature (or characteristic feature signature set) from the programming selected for viewing and the storing of a time-stamped signature (or signature set) in a memory for subsequent transmission to a central data collection office where the signature (or signature set) is compared with corresponding reference signatures collected by the central office from known broadcasting sources. This approach is taught by Lert and Lu in U.S. Pat. No. 4,677,466. The teaching of U.S. Pat. No. 4,677,466 is herein incorporated by reference.

Such monitoring equipment in the sampled household also stores a time stamp in addition to the ancillary code or program signature. The time stamp is used to determine the time and date of viewing and/or listening relative to the selected program.

Yet another approach to the measurement of the usage of electronic entertainment equipment has been that of comparing the viewed signal (or some component or artifact thereof) with all the signals available to a sampled household at the time the measurement is made. A review of apparatus and methods useful for this measurement approach is found in the teachings of Thomas, et al. in U.S. Pat. No. 5,629,739 and of Lu, et al. in U.S. Pat. No. 5,594,934. The teachings in U.S. Pat. No. 5,594,934 and in U.S. Pat. No. 5,629,739 are herein incorporated by reference.

Chan, in U.S. application Ser. No. 08/654,309, filed on May 28, 1996, teaches a sensor arrangement for non-intrusively obtaining a representation of video and synchronization signals from a television receiver. The disclosure of the aforementioned U.S. application Ser. No. 08/654,309 is herein incorporated by reference.

Thomas, et al., in U.S. Pat. No. 5,425,100 and U.S. Pat. No. 5,526,427, both of which are assigned to the same assignee as the present invention, teach a hierarchical, multi-level encoding system for identifying a transmitted program by reading an ancillary program identifying code which is sequentially added to the program as it passes through various stages of a program distribution network. The disclosures of U.S. Pat. No. 5,425,100 and U.S. Pat. No. 5,526,427 are hereby incorporated by reference. Other program monitoring systems employing ancillary codes which are embedded in a transmitted program are taught by Haselwood, et al. in U.S. Pat. No. 4,025,851 and by Crosby in U.S. Pat. No. 3,845,391.

A program monitoring system that exclusively relies on ancillary codes may produce inaccurate results when ancillary codes are either intentionally or accidentally omitted from program signals. Even when the original program signal is encoded with an ancillary code, there is a risk that the ancillary code will be intentionally removed before the program signal is viewed or heard. There is also the risk that ancillary codes may be accidentally removed before the program in which they are embedded is viewed or heard. For example, ancillary codes that are embedded in video or audio program signals so that they are undetectable to a viewer or listener, or so that they are at least unobtrusive enough to be no more than minimally detectable by a viewer or listener, are commonly stripped from the video or audio program signals when the video or audio program signals are compressed (e.g., such as by the MPEG II compression scheme used with digital television signals).

Moreover, ancillary codes, which are inserted into vertical blanking intervals (VBI) of the video portions of program signals, and which survive passage through the signal transmission chain so as to be received by a user's television receiver, are commonly removed from the video before the video is applied to the CRT of a television. As a result, non-intrusive acquisition of these VBI ancillary codes is impractical because such non-intrusive acquisition usually requires the use of probes which generally pick up the video sent by the tuner to the CRT after the VBI ancillary codes have already been stripped from the video.

Therefore, ancillary codes in the vertical blanking interval are more easily detected if the monitored television receiver is opened so that leads of the monitoring equipment can be soldered to video test points of the television receiver at which the ancillary codes are still present. However, such an arrangement is intrusive, leading to objections by the members of the statistically sampled households.

Signal comparison program monitoring systems, other than signature matching systems such as those described above, have also been used in order to determine the signal sources (e.g., channels) of the programs being viewed or heard. One of the oldest known signal comparison program monitoring system compares a synchronization component of a television program signal selected by a television tuner with a corresponding synchronization component in a program signal selected by a reference tuner. This signal comparison program monitoring system credits viewing to the signal source selected by the reference tuner when and if the two synchronization components match within some predetermined error.

Currey, in U.S. Pat. No. 3,372,233, provided an early teaching of such a program monitoring system which compared the phasing of vertical synchronization signals for this purpose. Currey's approach was not particularly successful because the vertical synchronization components from different signal sources occasionally match. When this type of matching occurs, the program source measurement is ambiguous. Solar, in U.S. Pat. No. 4,764,808, and Gall, in U.S. Pat. No. 4,847,685, provided improved synchronization component measurement systems that did not entirely overcome the basic shortcoming of the Currey approach. In U.S. Pat. No. 5,294,977, Fisher, et al. disclosed a synchronization component based measurement system operating in a restricted environment in which such phase coincidences can be avoided.

Another signal comparison program monitoring system correlates a receiver signal, which may be extracted from a receiver being monitored, with a reference signal, which may be supplied by a reference tuner that is tuned consecutively to the possible program signal sources to which the monitored receiver may be tuned. This correlation system determines the channel being viewed or heard when the correlation between the receiver signal from the monitored receiver and the reference signal from the reference tuner exceeds some predetermined value. This monitoring approach was initially adapted for the purpose of in-home identification of viewed television programs by Kiewit, et al. in U.S. Pat. No. 4,697,209, the disclosure of which is herein incorporated by reference. The teachings of Kiewit, et al. have been expanded upon by Thomas, et al., in U.S. Pat. No. 5,481,294, who described the use of signatures extracted from either a video component or an audio component of a receiver signal, and who discussed the operational advantages of using non-invasive sensors to acquire the components.

A further comparison program monitoring system was placed in commercial service in 1984 by the A. C. Nielsen Company and was internally referred to as the Real Time Correlation (RTC) system. The RTC system used a combination of vertical synchronization component matching and audio correlation to identify an unknown signal. The RTC system did so by first making a preliminary identification based upon matching of vertical synchronization components. However, this preliminary identification would not be unique if the unknown transmitted signal, for example, was one of several sync-locked signals originating at a local cable head-end. Therefore, the RTC system resolved ambiguities by correlating the audio component of the selected transmitted signal from the monitored television with the audio component of the reference signal from the reference tuner whose synchronization component matched the synchronization component of the transmitted signal.

Correlation program monitoring systems are generally more robust and less affected by signal degradation than are code reading program monitoring systems. Even so, a signal correlation program monitoring system, which compares two signals (e.g., a receiver signal selected by a monitored television at a television viewing site in a statistically sampled household, and a reference signal selected by a reference tuner at a different local reference site), works best when the two signals to be correlated are both high quality replicas of what was actually transmitted. If one of the correlated signals, such as the receiver signal selected by the monitored television, is acquired by a non-intrusive sensor at the television viewing site, and if the other correlated signal, such as the reference signal selected by the reference tuner, is acquired from the audio or video circuitry of a tuner at a different local reference site, artifacts introduced by the non-intrusive measurement at the television viewing site may have a substantial adverse impact on the correlation between the receiver and reference signals. To reduce such artifacts, Thomas, et al., in the aforementioned U.S. Pat. No. 5,481,294, teach the suppression or removal of background noise from an audio signal acquired by a non-intrusive microphone at the receiver viewing or listening site.

Another problem facing signal correlation systems is that, because signal correlation systems require an on-going collection of reference signatures by equipment dedicated to monitoring the signals transmitted from each program signal source in whatever regional market is being measured, the operating cost of a signature-based program monitoring system is generally higher than that of a comparable program monitoring system relying on ancillary codes.

A problem facing all, or nearly all, program monitoring systems arises from signal sources which originate within the household itself. Signal sources of this sort may include computers or video games, which use the monitored television's display, and video cassette (or tape) recorders, which play program signals that were recorded at earlier times or that are recorded on rental cassettes (or tapes). The use of such local signal sources is, with one exception to be discussed below, systematically excluded from a long-established audience measurement parameter called "Households Using Television" (HUT) because the use of a television receiver with a locally generated signal does not fall within the scope of conventional television audience measurements.

Moreover, if a local signal source is not identified as such, a program monitoring system could either (i) erroneously count viewing or listening based on this local signal source as it would count viewing or listening based upon a remote signal source, or (ii) label the viewing or listening based on the local signal source as an unidentified activity. Either way, viewing or listening based upon a local signal source would be included as contributions to the overall HUT value reported by the program monitoring system in such a way as to create ambiguities.

The exception mentioned above relates to recording of programs by VCRs for later time shifted viewing. The reportable HUT value generally counts time-shifting viewing either at the time of recording or at the time of playback, but does not count at both recording and playback. By not counting at both recording and playback, double counting is avoided. Also, whether counting is done at the time of recording or at the time of playback, program monitoring systems strive to count only transmitted programs and seek to avoid counting non-transmitted programs, such as rented movies.

Also, a VCR typically has a number of modes in a non-record mode. For example, in a monitor mode, the VCR is used to pass through a currently selected transmitted program signal so that the signal may be viewed on a television, but the VCR does not concurrently record the signal. In a tune/record mode, the VCR is used to pass through a currently selected transmitted program signal for both viewing and recording. In a non-tune/record mode, the VCR is used to record a program without concurrent viewing of the program on a television; thus, the program is recorded for time-shifted playing. In a play mode, the VCR is used to play transmitted materials, such as time-shifted recordings, and non-transmitted materials, such as rented movies. In an off mode, the VCR is off. Because of this number of modes, a VCR presents one of the most difficult program monitoring challenges.

Early measurements of VCRs in sampled households involved monitoring of both the control switches and the tuners of VCRs. This monitoring resulted in the measurement of recording, which was credited to program ratings when recorded, and in the identification of all other uses as not contributing to program ratings. Thus, for example, when recording was counted as HUT viewing, all play activity was counted as non-HUT usage. These early measurements of VCRs involved a complicated and expensive disassembly and modification of consumers' equipment in order to physically connect switch monitoring equipment to the VCR switches.

Subsequent improvements in VCR measurement provided less invasive, and in some cases entirely non-invasive, ways of acquiring the requisite signals. In U.S. Pat. No. 4,633,302, Damoci teaches a method of picking up an artifact from the output of a VCR's erase-head in order to ascertain that the measured VCR is recording a tuned signal. Vitt, et al., in U.S. Pat. No. 5,165,069, teach a further improved measurement method in which all the status information (including a sensed erase-head output, which is commonly selected by different manufacturers to be a continuous wave (CW) tone lying between thirty and seventy-five KHz) is acquired from a sensor or pickup located immediately adjacent to, but externally of, the VCR's housing. The disclosure of Vitt, et al. is herein incorporated by reference. Mostafa, et al., in U.S. Pat. No. 5,495,282, teach yet another non-invasive arrangement for monitoring the operation of a VCR by injecting encoded identification signals into the VCR and searching for that signal in the RF output from the VCR. Yet the monitoring of VCRs continues to be a difficult problem.

Changes in the methods of measuring the reception of television or radio programming are required because of a planned change-over from analog to digital broadcasting. In the U.S., the change-over is scheduled to be phased in by the year 2006, as documented in the Federal Communication Commission's Mass Media Docket 87-268, with particular reference to the Fifth Report and Order, FCC 97-116, Apr. 3, 1997 and to the Sixth Report and Order, FCC 97-115, Apr. 3, 1997. Some of the changes, and their respective impacts on approaches used for measuring analog broadcasts, include the following: (1) digital broadcast techniques do not use a vertical blanking interval and, therefore, the program tracking and identifying codes that are written in the vertical blanking interval of analog broadcast signals will not be transmitted; (2) multiple signal formats and associated multiple display formats having, among other features, differing height-to-width ratios and different resolutions are allowed, so that existing video signal correlation methods used with analog broadcasts may essentially be disabled because these methods depend on having the same pictorial feature appear at corresponding places on the measured and reference displays; (3) a broadcaster can transmit as many as six programs (arrayed as a sequence of data packets, where each data packet is labeled as to which of the programs' data is carried therein) within an assigned 6 MHZ frequency band by trading off pictorial resolution for an increase in the number of programs so that (i) digital signal compression methods used to decrease the spectrum space required by a program destroy program identifying codes embedded in an original, high-resolution, program master, and (ii) determining which channel has been tuned by a receiver does not uniquely identify a program being viewed if more than one program is being transmitted in that channel; and, (4) data other than television broadcasting may be co-transmitted in the same channel and, in some cases, it is expected that the other data will be related in some manner to the co-transmitted programming so that a viewer can interact with the TV programming (e.g., to obtain a program guide or detailed information on an advertised product, to automatically switch to a desired program, or to take part in an audience-participation program).

It may be noted that, although projected digital signal compression and transmission methods destroy the types of video codes used in, and suggested for, the prior-generation analog broadcasting approaches, it is expected that less change will be encountered with respect to audio codes. That is, because the audio component of a television broadcast comprises much less information than does the video, there is much less to be gained by applying signal compression methods to audio. Nonetheless, it is expected that various audio compression methods may be employed. These methods include those defined by the Dolby AC-3 or the European MUSICAN standards, or those defined by some yet-to-be-defined standard operable within the relatively open and flexible MPEG arrangement. Although the coding approaches taught in the aforementioned U.S. Pat. No. 5,404,377 are known to survive the Dolby AC-3 and MUSICAN compression methods, compression methods other than Dolby AC-3 and MUSICAN may destroy these codes. Moreover, although the change in technology may obviate the use of some of the codes, such as those described above, other codes (e.g., digital data packet codes telling a receiving site which of several interleaved programs is associated with a given data packet) are expected to be broadcast both with television programming and with any co-transmitted data that are related to, and intended to be used in conjunction with, one or more of the programs.

In addition to changes in transmission equipment and signals, considerable changes are expected in reception equipment. Notable among these are both the use of set top signal converters (generally referred to as set top boxes) allowing a digital broadcast to be viewed on an analog receiver, and a projected convergence of television receivers and computers. In the short term, for example, it is expected that digital receivers, configured as plug-in boards for personal computers, will be used to enable the display of digital television signals on the computers.

Another traditional measurement reflected in television audience reporting has been the determination of who actually viewed the program that was received by the equipment being monitored in a statistically selected monitoring site. A related measurement of interest is the identification of users of on-line services, such as on-line services provided over the Internet. Also, it is clear that measuring the members of an audience in a statistically selected monitoring site who are interactively using a television and/or accessing the Internet, and the information delivery apparatus used to deliver information to the members, will continue to be important.

By far the most commonly used approach in making these measurements is that of interrogation, wherein the viewer and/or Internet user is asked to identify himself or herself as a member of the television audience or as an Internet user. In connection with television viewing, this inquiry is usually done by means of an electronic prompting and data input device (commonly referred to as a Peoplemeter) associated with a monitored receiver in a statistically selected monitoring site. The member identification may also include age, sex, and other demographic data. It is common to store both the demographic data and the tuning data associated with each monitored receiver in the statistically selected monitoring site in store-and-forward equipment located within the monitoring site and to subsequently forward these data to a central office computer via a direct call over the public switched telephone network or via the Internet on a daily basis.

Of particular interest in this area is the teaching of an audience interrogation arrangement disclosed by McKenna, et al., in U.S. Pat. No. 4,816,904. According to this arrangement, a prompting message is displayed on a television screen overlaid on viewer selected programming by mixing the prompting message with the video signal being sent to the display. However, McKenna, et al. do not teach a "tiling" arrangement where the prompting message is displayed on a portion of a display separated from the portion of the display devoted to television picture.

Many arrangements have been proposed in the computer arts for reliably identifying a user so that only selected individuals can secure access to some of the data on a computer or computer system. The most common of such arrangements is that of requiring the user to enter both his or her claimed identity along with a password. Other arrangements have included the use of various biometric techniques, such as image or voice recognition devices. Additionally, it is well known in the audience measurement arts to use computer-based image recognition in order to identify members of a viewing audience. Notable among teachings in this area is that by Lu in U.S. Pat. No. 4,858,000. The teaching of this patent is herein incorporated by reference.

BRIEF DESCRIPTION OF THE DRAWINGS

FIG. 4 is a state table summarizing VCR measurements which may be made using the system of FIG. 3.

DETAILED DESCRIPTION

Figure 1:
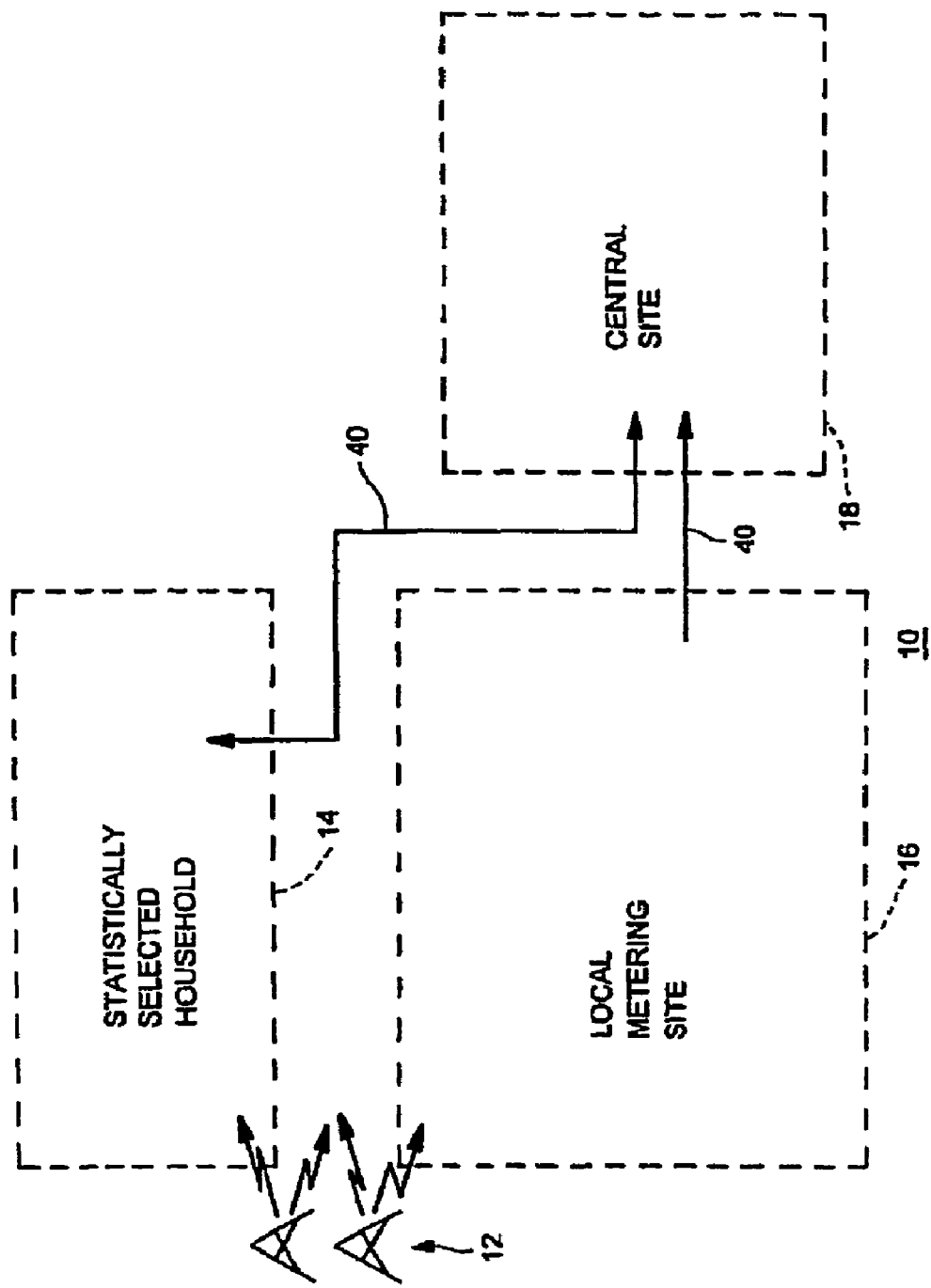
FIG. 1 is a schematic illustration showing the components of a prior art television audience measurement system.

A television audience measurement system 10 of the sort taught by Thomas, et al. in U.S. Pat. No. 5,481,294 is depicted schematically in FIG. 1. Programs transmitted from a plurality of program transmitters 12 (which are depicted in the drawing as over-the-air transmitters, but which may include any transmitter of program signals such as CATV, direct satellite broadcast, and/or the like) are received at a statistically selected household 14. The same program signals from the same program transmitters 12 are also received by a local monitoring site 16. Generally, although not necessarily, the local monitoring site 16 of the television audience measurement system 10 is located in a corresponding regional market being measured, and serves a plurality of statistically selected households, such as the statistically selected household 14, which are located within that regional market. All such statistically selected households communicate their data to a central site 18.

Also, there may be a plurality of regional markets each having a corresponding local monitoring site 16 and each local monitoring site 16 serving a plurality of corresponding statistically selected households 14. All such statistically selected households and all such local monitoring sites communicate their data to the central site 18.

Data, which may comprise identifying ancillary codes transmitted with the programs transmitted by the program transmitters 12, or which may comprise program signatures characteristic of such programs, are extracted from the received transmitted programs by both the statistically selected household 14 and the local monitoring site 16, and the extracted data are sent from both the statistically selected household 14 and the local monitoring site 16 to the central site 18. The central site 18 compiles television audience reports based upon this data from the statistically selected household 14 and the local monitoring site 16 as well as from all other statistically selected households located within the receiving area of the local monitoring site 16, from all other statistically selected households located within the receiving areas of all other corresponding local monitoring sites, and from all other local monitoring sites.

In general accordance with the teachings of Thomas, et al. in U.S. Pat. No. 5,481,294, the portion of the television audience measurement system 10 located within the statistically selected household 14 is shown in more detail in FIG. 2. As shown therein, the program transmitters 12 transmit RF program signals to a signal input 20, which is generally shown as an antenna but which may be any other type of program signal input, such as a cable input, a satellite dish, and/or the like. The program signals received by the signal input 20 may comprise a plurality of channels of television programming and are routed to one or more television receivers 22, 22' of the statistically selected household 14.

Each of the television receivers 22, 22' may have associated with it a corresponding local (i.e., non-transmitted) video signal source 24, 24'. For example, the local video signal source 24 associated with the television receiver 22 may be a video game 26, and the local video signal source 24' associated with the television receiver 22' may be a VCR 28. The local video signal sources 24, 24' may be configured to send their output video signals to their corresponding television receivers 22, 22'.

Non-invasive signal sensors 30, such as microphones, photodetectors, inductive pickups, and/or the like, are arranged, and are located, to acquire representations of the program signals selected for viewing on the television receiver 22. These representations are preprocessed by a preprocessing circuit 32 in a manner, for example, described in the aforementioned U.S. Pat. No. 5,481,294. The preprocessed representations are passed to a code reader 34 and to a signature extractor 36. The code reader 34 and the signature extractor 36 produce program identifying data from the preprocessed representations. Thus, for example, the code reader 34 reads ancillary codes from the preprocessed representations, and the signature extractor 36 extracts signatures from the preprocessed representations.

The program identifying data extracted by the code reader 34 and the signature extractor 36 are sent to a data storage and telecommunication processor 38 for subsequent transmission by way of a transmission medium 40 to the central site 18. Also, as is well known in the art, a local clock 42 associated with the data storage and telecommunication processor 38 is conventionally synchronized with a master clock at the central site 18 whenever data are transferred between the statistically selected household 14 and the central site 18 over the transmission medium 40. The transmission medium 40, for example, may be the public switched telephone network.

Similarly, non invasive signal sensors 30' are arranged, and are located, to acquire representations of the program signals selected for viewing on the television receiver 22'. These representations are preprocessed by a preprocessing circuit 32'. The preprocessed representations are passed to a code reader 34' and to a signature extractor 36'. The code reader 34' and the signature extractor 36' produce program identifying data from the preprocessed representations. Thus, for example, the code reader 34' reads ancillary codes from the preprocessed representations, and the signature extractor 36' extracts signatures from the preprocessed representations. The program identifying data read by the code reader 34' and extracted by the signature extractor 36' are sent to the data storage and telecommunication processor 38 for subsequent transmission to the central site 18.

A people meter 43 may also be associated with the television receiver 22. The people meter 43 may be any of the people meters used by Nielsen Media Research, Inc. to meter the viewing habits of panelists, and generally determines the channel being viewed and the identities of the viewers of the television receiver 22. Also, a people meter 43' may be associated with the television receiver 22'. The people meter 43' may be similar to the people meter 43.

Figure 2:
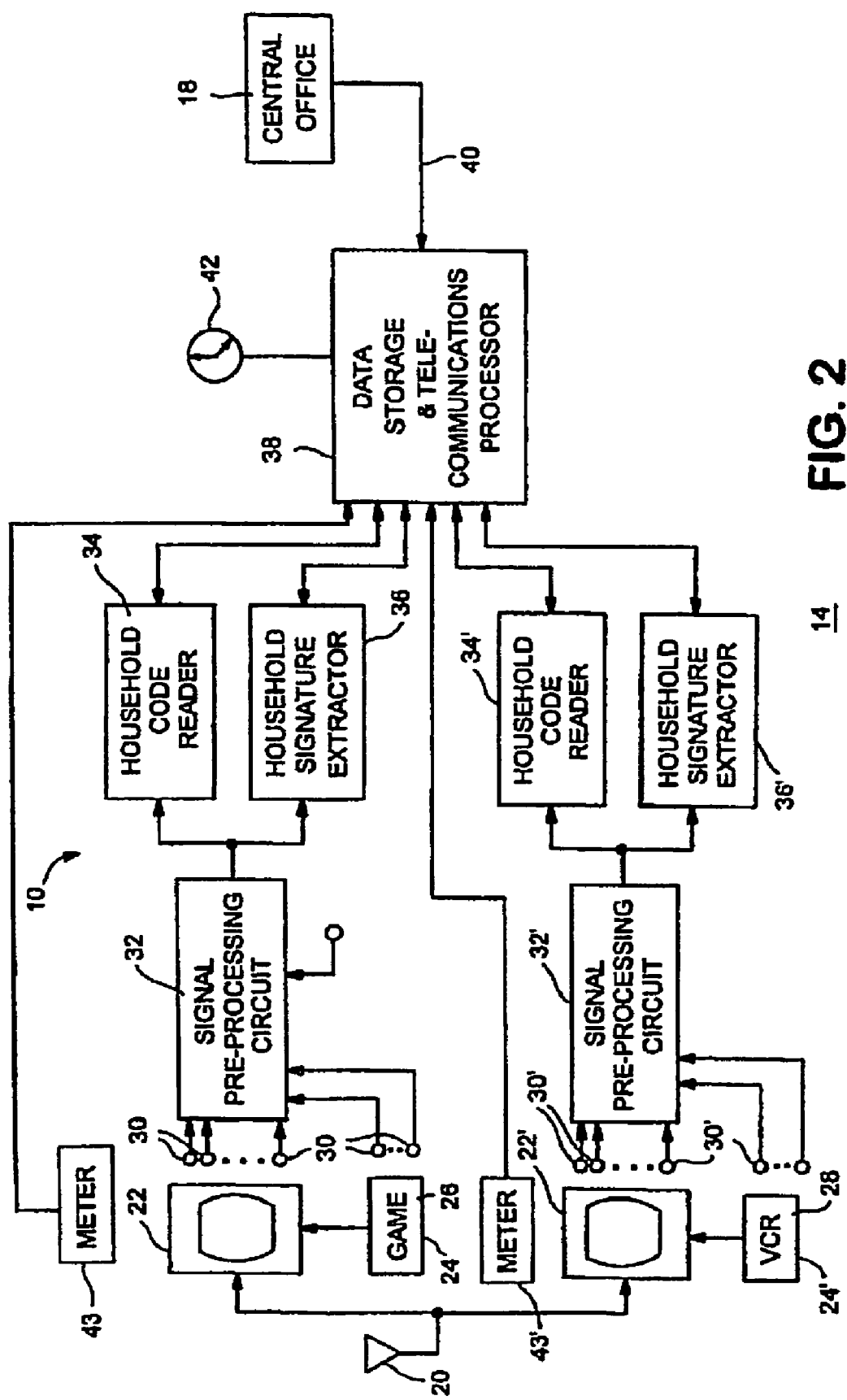
FIG. 2 illustrates in greater detail the statistically selected household of FIG. 1 as measured in accordance with the prior art.
Figure 3:
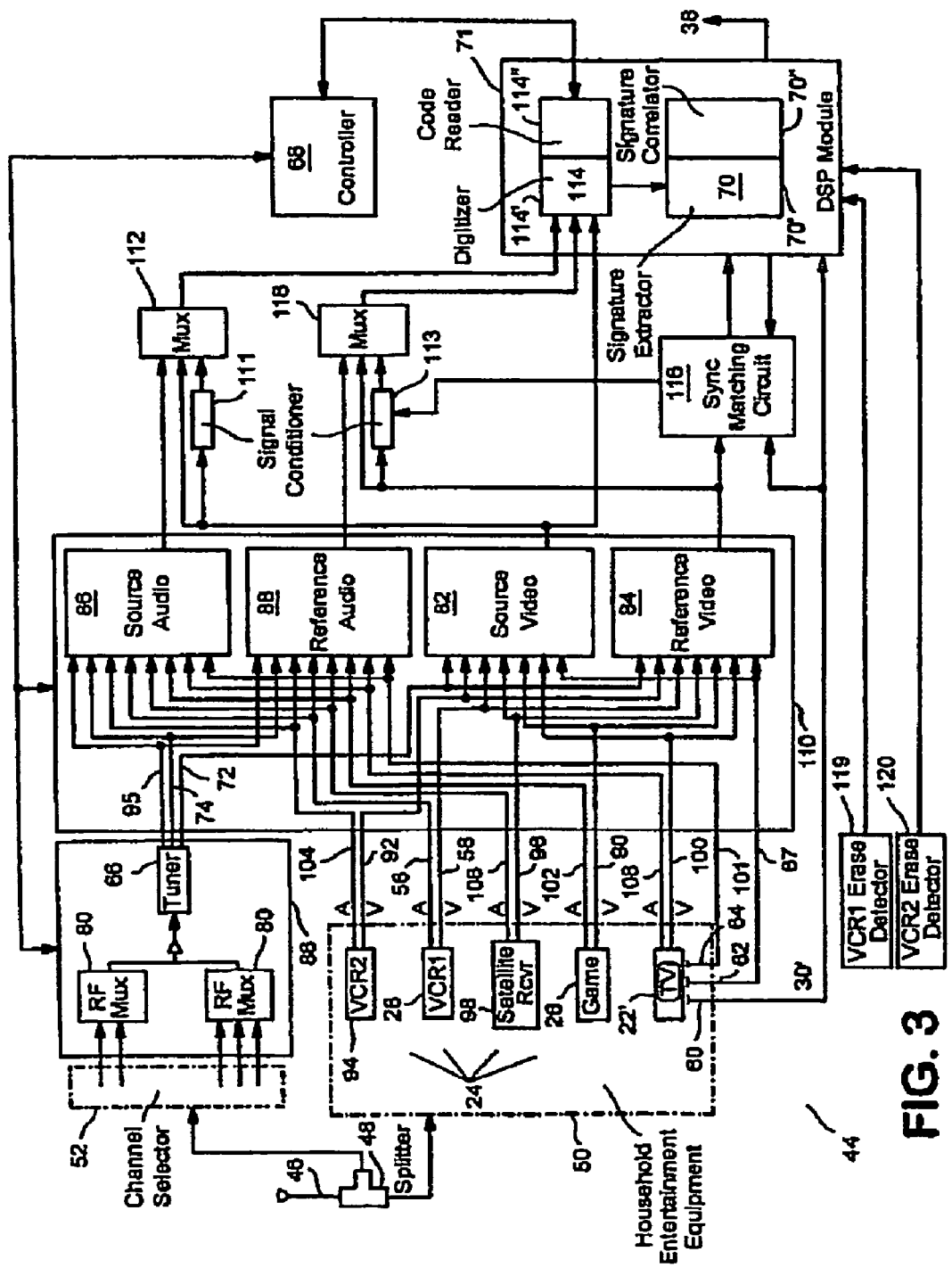
FIG. 3 is a schematic block diagram of a first example system to monitor the reception of programs and content by broadcast receivers are disclosed.

FIG. 3 illustrates a block diagram of a first example system to monitor reception of programs and content by broadcast receivers. The example system of FIG. 3 employs a program signal source detector 44 which may be used for the portion of the television audience measurement system 10 located within the statistically selected household 14 as shown in FIG. 2 and which is suitable for accurately determining a local source of signals, such as the VCR 28, being displayed on a monitored television, such as the television receiver 22'. If desired, the local metering site 16 may be eliminated. However, the local metering site 16 may be desirable in those markets where no one statistically selected household receives all of the possible signals that are available in the market in which the statistically selected household 14.

As shown in FIG. 3, a signal input 46, which is generally shown as an antenna but which may be any program signal input, such as a cable input, a satellite dish, and/or the like, receives the program signals transmitted by the program transmitters 12. The program signals received by the signal input 46 may comprise a plurality of channels of television programming. The program signals received by the signal input 46 may be split by a splitter 48 so as to be fed to both household entertainment equipment 50 and a channel selection apparatus 52. It should be noted here that, in determining the local source of video and/or audio being displayed by the television receiver 22', the output of the television receiver 22' is the reference signal, and the output of the channel selection apparatus 52, the game 26, the VCR 28, etc. is the source signal. The household entertainment equipment 50 and the channel selection apparatus 52 are located within the statistically selected household 14. As is known, a user of the household entertainment equipment 50 may choose from among many various interconnections in order to route a selected signal to a television and/or other equipment. In the interest of clarity of presentation, however, these various interconnections, which may be made by the user, are not shown in FIG. 3.

In some cases, the selected signal is routed through the VCR 28 and then supplied to its associated television receiver 22'. This routing is commonly done at RF via a suitable cable from an RF output of the VCR 28 to an RF input of the television receiver 22', but the signal may also be supplied to the television receiver 22' as a baseband audio signal from a VCR baseband audio output of the VCR 28 and/or as a baseband video signal from a VCR baseband video output of the VCR 28. For purposes of the program signal source detector 44, however, a VCR audio output 56 of the VCR 28 may be a baseband audio output of the VCR 28, and a VCR video output 58 of the VCR 28 may be a baseband video output of the VCR 28.

In one mode of operation of the VCR 28, hereinafter called the "TV mode," the RF signals from the signal input 46 are supplied directly to the television receiver 22', and the VCR 28 is not involved in the tuning process. The VCR 28 is in this mode whenever it is unpowered. In another mode, hereinafter called "VCR TUNE," a tuner within the VCR 28 is used to select one of the plurality of program signals received by the signal input 46 and to supply that selected signal as an output of the VCR 28 to its television receiver 22'. In a further mode, hereinafter called "PLAY," a signal stored on a video cassette (or tape) is supplied by the VCR 28 to its television receiver 22'. In yet a further mode, hereinafter called "RECORD," a program signal is recorded by the VCR 28 for later, time shifted viewing.

When the VCR 28 is in the RECORD mode, its erase head is powered to erase whatever old signal may be on the cassette (or tape) before the new signal is recorded. The operation of the erase head can be detected by finding some artifact of the erase head tone. As noted by Vitt, et al. in U.S. Pat. No. 5,165,069, this detection may be done in a non-invasive manner with an inductive sensor installed adjacent to the VCR 28. It also has been also found that an artifact of the erase head signal can often be detected directly from the VCR audio output 56 of some models of the VCR 28. The manner of detecting the erase head signal depends on the specific model of the VCR 28 being monitored. If an artifact of the erase head signal cannot be detected directly from the VCR audio output 56 of the VCR 28, the program signal source detector 44 may employ an input from a radiated signal pickup (not shown) of the sort disclosed by Vitt, et al.

As shown in FIG. 3, three of the non-invasive signal sensors 30' are employed to acquire representations of various signal components from the television receiver 22' whenever it is turned on. These three non-invasive signal sensors may include: (i) a suitable sync signal pickup 60 which may be of the type disclosed in U.S. application Ser. No. 08/654,309 filed on May 28, 1996, which is disposed adjacent the television receiver 22', and which picks up a representation of the vertical and horizontal synchronization pulses of the television receiver 22', (ii) a video signal pickup 62 which may be of the type disclosed in the aforementioned U.S. application Ser. No. 08/654,309 filed on May 28, 1996 and which is arranged to pick up a representation of the video signal being displayed by the television receiver 22', and (iii) an audio signal pickup 64, which may be a microphone as taught by Thomas, et al. in U.S. Pat. No. 5,481,294 and which is used to acquire the audio portion of the displayed program signal for subsequent matching operations.

It is noted that the video signal pickup 62 may not, and probably does not, acquire the full video signal (some attenuation at the higher frequencies and the lowest frequencies is common), but the failure of the video signal pickup 62 to acquire the full video signal is of no particular concern in the overall measurement system of the present invention because the matching operations disclosed hereinafter can be conducted using only mid-frequency components of the various video signals. It is also noted that the video signal pickup 62 may not, and probably does not, acquire the information contained in the vertical blanking interval of the video signal because the video signal pickup 62 is preferably located near the CRT of the television receiver 22' and because the vertical blanking interval is commonly not supplied to the CRT video of the television receiver 22'. Accordingly, ancillary codes located in the vertical blanking interval cannot be read from the output of the video signal pickup 62. It will be understood to those skilled in the art that both the video signal pickup 62 and the audio signal pickup 64 may employ appropriate circuitry (not separately shown) to match their output levels to the industry standard output levels of the signals obtained from the VCR video output 58 and the VCR audio output 56 against which they are matched.

If the television receiver 22' is a television model provided with an external video jack, such an external video jack can be used in lieu of the video signal pickup 62 and the sync signal pickup 60. Similarly, if the television receiver 22' is a television model provided with an external audio jack, such an external audio jack can be used in lieu of the audio signal pickup 64.

The channel selection apparatus 52 of the program signal source detector 44 employs a source scanning tuner 66. The source scanning tuner 66 has access to the signal input 46 by means of the splitter 48 and may scan all of the available programming channels under control of a controller 68. The controller 68 may be a PIC16c65 that is slaved to a digital signal processor 70 (which may be a Texas Instrument model TMS 320C32-60) of a digital signal processing module 71. The digital signal processor 70 may be considered to have a signature extraction portion 70' and a signature correlating portion 70". The source scanning tuner 66 provides a video output 72 and one or two audio outputs 74 and 95 (the second of these being associated with a Secondary Audio Program (SAP) signal component of some television transmissions) that are subsequently used in matching operations in order to determine the source of the signals displayed on the television receiver 22'.

As depicted in FIG. 3, the program signal source detector 44 is capable of (i) extracting an audio program signature from a program signal, (ii) extracting a video program signature from the program signal, (iii) extracting an audio ancillary code from the program signal, and (iv) extracting a video ancillary code from the program signal. Any one or more of these detection functions may be used in order to identify the local source of the signals displayed by the television receiver 22'. For example, the tuner of the television receiver 22' may be identified as the source of the signals being displayed by the television receiver 22' if a reference audio signature extracted from an audio output of the television receiver 22' matches a source audio signature extracted from an audio output of the source scanning tuner 66 or if a reference video signature extracted from a video output of the television receiver 22' matches a source video signature extracted from a video output of the source scanning tuner 66.

Similarly, the VCR 28 may be identified as the local source of the signals being displayed by the television receiver 22' if a reference audio signature extracted from an audio output of the television receiver 22' matches a source audio signature extracted from an audio output of the VCR 28 or if a reference video signature extracted from a video output of the television receiver 22' matches a source video signature extracted from a video output of the VCR 28, the game 26 may be identified as the local source of the signals being displayed by the television receiver 22' if a reference audio signature extracted from an audio output of the television receiver 22' matches a source audio signature extracted from an audio output of the game 26 or if a reference video signature extracted from a video output of the television receiver 22' matches a source video signature extracted from a video output of the game 26, and so on.

The channel selection apparatus 52 may receive a plurality of RF program signals in addition to the RF program signals received by the signal input 46. For example, these other program signals may include off-air channels received by an antenna other than the antenna 46, channels received by way of a CATV cable (which may be received directly, or which may be received through a cable converter), channels may be received by a satellite dish, and/or the like. The program signals received by the signal input 46 and the other program signals described above are connected through RF multiplexers 80 to the input of the source scanning tuner 66 under control of the controller 68.

The video output 72 from the source scanning tuner 66 is applied to both a source video multiplexer 82 and a reference video multiplexer 84, while the audio output 74 and the second audio program (SAP) output 95 from the source scanning tuner 66 are applied to both a source audio multiplexer 86 and a reference audio multiplexer 88. Also applied to both the source video multiplexer 82 and the reference video multiplexer 84 are (i) the VCR video output 58 from the VCR 28, (ii) a video output 90 from the video game 26, (iii) a VCR video output 92 from a second VCR 94 which might also be used with the television receiver 22', (iv) a video output 96 from a Direct Broadcast Satellite receiver 98, and (v) a video output 100 from the television receiver 22'. Similarly, applied to both the source audio multiplexer 86 and the reference audio multiplexer 88 are (i) the VCR audio output 56 from the VCR 28, (ii) an audio output 102 from the video game 26, (iii) a VCR audio output 104 from the second VCR 94, (iv) an audio output 106 from the Direct Broadcast Satellite receiver 98, and (v) an audio output 108 from the television receiver 22'. The source video multiplexer 82, the reference video multiplexer 84, the source audio multiplexer 86, and the reference audio multiplexer 88 comprise an input multiplexer module 110. Additionally, the video signal pickup 62 is applied to the source video multiplexer 82 and to the reference video multiplexer 84, and the audio signal pickup 64 is applied to the source audio multiplexer 86 and to the reference audio multiplexer 88.

The output from the source video multiplexer 82 is connected through a video signal conditioner circuit 111 and a multiplexer 112 to one input of a digitizer 114' and then to the signature extraction portion 70' of the digital signal processor 70. Similarly, the output from the reference video multiplexer 84 is connected through a video signal conditioner circuit 113 and a multiplexer 118 to one input of the digitizer 114' and then to the signature extraction portion 70' of the digital signal processor 70. The signature extraction portion 70', similarly to the signature extractor 36 of FIG. 2, extracts video program signatures from signals on selected ones of the inputs of the source video multiplexer 82 and the reference video multiplexer 84. Accordingly, the signature correlation portion 70" may correlate reference video signatures extracted from a video output of the television receiver 22' to source video signatures extracted from a video output of the game 26, a video output of the VCR 28, a video output of the source scanning tuner 66, a video output of the second VCR 94, and/or a video output of the Direct Broadcast Satellite receiver 98, in order to determine whether the tuner of the television receiver 22', the game 26, the VCR 28, the second VCR 94, or the Direct Broadcast Satellite receiver 98 is the source of the signals being displayed by the television receiver 22'.

The output from the source video multiplexer 82 is also connected directly through the multiplexer 112 and the digitizer 114' to a code reader 114". Similarly, the output from the reference video multiplexer 84 is also connected directly through the multiplexer 118 and the digitizer 114' to the code reader 114". The code reader 114" may be similar to the code reader 34 of FIG. 2. The code reader 114" extracts an ancillary code from a signal on a selected one of the inputs of the source video multiplexer 82 and/or on a selected one of the inputs of the reference video multiplexer 84.

The output from the source audio multiplexer 86 is connected through the multiplexer 112 to one input of the digitizer 114' and then to the signature extraction portion 70' of the digital signal processor 70. Similarly, the output from the reference audio multiplexer 88 is connected through the multiplexer 118 to one input of the digitizer 114' and then to the signature extraction portion 70' of the digital signal processor 70. The signature extraction portion 70' extracts audio program signatures from signals on selected ones of the inputs of the source audio multiplexer 86 and the reference audio multiplexer 88. Accordingly, the signature correlation portion 70" may correlate reference audio signatures extracted from an audio output of the television receiver 22' to source audio signatures extracted from an audio output of the game 26, an audio output of the VCR 28, an audio output of the source scanning tuner 66, an audio output of the second VCR 94, and/or an audio output of the Direct Broadcast Satellite receiver 98, in order to determine whether the tuner of the television receiver 22', the game 26, the VCR 28, the second VCR 94, or the Direct Broadcast Satellite receiver 98 is the source of the signals being displayed by the television receiver 22'.

The output from the source audio multiplexer 86 is also connected directly through the multiplexer 112 and the digitizer 114' to the code reader 114". Similarly, the output from the reference audio multiplexer 88 is also connected directly through the multiplexer 118 and the digitizer 114' to the code reader 114". The code reader 114" extracts an ancillary code from a signal on a selected one of the inputs of the source audio multiplexer 86 and/or on a selected one of the inputs of the reference audio multiplexer 88.

The output from the reference video multiplexer 84 is also connected to a sync matching circuit 116 which compares the standard sync signal as sensed by the sync signal pickup 60 with the sync signals derived from the signal on a selected one of the inputs of the reference video multiplexer 84. The sync matching circuit 116 passes a match between the standard sync signal as sensed by the sync signal pickup 60 and a sync signal derived from the signal on a selected one of the inputs of the reference video multiplexer 84 to the digital signal processing module 71.

With this arrangement, a reference video signature extracted from a video output of the television receiver 22' may be compared to source video signatures extracted from a video output of the game 26, a video output of the VCR 28, a video output of the source scanning tuner 66, a video output of the second VCR 94, a video output of the Direct Broadcast Satellite receiver 98, and the like in order to determine the local source of the signals displayed by the television receiver 22'. Alternatively or in addition, a reference audio signature extracted from an audio output of the television receiver 22' may be compared to source audio signatures extracted from an audio output of the game 26, an audio output of the VCR 28, an audio output of the source scanning tuner 66, an audio output of the second VCR 94, an audio output of the Direct Broadcast Satellite receiver 98, and the like in order to determine the local source of the signals displayed by the television receiver 22'.

Because the correlation of signatures is computationally expensive, the digital signal processing module 71 may first control the reference video multiplexer 84 in order to pass the video signal on the video output 72 of the source scanning tuner 66 to the sync matching circuit 116 which matches suitable synchronization components of the video output of the source scanning tuner 66 and from the sync signal pickup 60. Until a match is found, the controller 68 causes the source scanning tuner 66 to sequentially tune to the possible signal sources.

When a match between synchronization components is found, the digital signal processing module 71 controls the source video multiplexer 82 in order to pass the video signal currently on the video output 72 of the source scanning tuner 66 to the video signal conditioner circuit 111, the multiplexer 112, and the signature extraction portion 70', and the digital signal processing module 71 controls the reference video multiplexer 84 in order to pass the video signal on the video output 100 (or 67) of the television receiver 22' to the video signal conditioner circuit 113, the multiplexer 118, and the signature extraction portion 70'. (The video signal conditioner circuit 113 is always bypassed when using the video signal from the video signal pickup 62.) The signature extraction portion 70' and the signature correlating portion 70" of the digital signal processor 70 extracts and correlates video signatures from the video signal corresponding to the channel selected by the source scanning tuner 66 and the video signal corresponding to a channel selected by the television receiver 22'. These channels are the channels that are in sync as determined by the sync matching circuit 116. If a match is not found, it may be concluded that the sync tested by the sync matching circuit 116 relates to different channels. Accordingly, the controller 68 steps the source scanning tuner 66 to the next channel to restart the process of finding synchronization and, if synchronization is found, of extracting and comparing video signatures. If a match of video signatures is found, the tuner of the television receiver 22' is identified as the local source of the signals displayed by the television receiver 22'.

Alternatively, when a match between synchronization components is found, the digital signal processing module 71 controls the source audio multiplexer 86 in order to pass the audio signal on the audio output 74 of the source scanning tuner 66 to the multiplexer 112 and the signature extraction portion 70', and the digital signal processing module 71 may control the reference audio multiplexer 88 in order to pass the audio signal on the audio output 108 (or the audio signal pickup 64) of the television receiver 22' to the multiplexer 118 and the signature extraction portion 70'. The signature extraction portion 70' and the signature correlating portion 70" of the digital signal processor 70 extracts and correlates audio signatures from the audio signal corresponding to the channel selected by the source scanning tuner 66 and the audio signal corresponding to a channel selected by the television receiver 22'. These channels are the channels that are in sync as determined by the sync matching circuit 116. If a match is not found, it may be concluded that the sync found by the sync matching circuit 116 relates to different channels. Accordingly, the controller 68 steps the source scanning tuner 66 to the next channel to restart the process of finding synchronization and, if synchronization is found, of extracting and comparing audio signatures. If a match of audio signatures is found, the tuner of the television receiver 22' is identified as the local source of the signals displayed by the television receiver 22'.

After a match is thus found, the identity of this signal source may be confirmed by reading an ancillary code, if present, from the video signal on the video output 72 of the source scanning tuner 66. It should be noted here that, if the video signal pickup 62 is used to derive a video signal from the television receiver 22', and if ancillary codes are inserted in the vertical blanking interval of video signals, the ancillary code cannot be read from the video signal on the video signal pickup 62 because, in many modern television sets, the vertical blanking interval is not present in video signal at the point where the video signal pickup 62 picks up the video signal. Accordingly, ancillary codes can instead be read from the video output 72 of the source scanning tuner 66 when the source scanning tuner 66 is tuned to the channel to which the television receiver 22' is tuned. However, if the video output 100 is used to derive a video signal from the television receiver 22', if the video output 100 is at baseband, and if ancillary codes are inserted in the vertical blanking interval of video signals, the ancillary code can be read from the video signal on the video output 100 because the vertical blanking interval is present in the baseband video signal. Alternatively, the identity of this signal source may be confirmed by reading an ancillary code, if present, from the audio signal on the audio output 74 of the source scanning tuner 66 or on the audio output 108 (or 64) of the television receiver 22'.

If signatures extracted from all of the channels to which the source scanning tuner 66 may be tuned do not match signatures extracted from the output of the television receiver 22', reference video and/or audio signatures extracted from a video and/or audio output of the television receiver 22' may be compared to source video and/or audio signatures extracted from a video and/or audio output of the game 26, from a video and/or an audio output of the VCR 28, from a video and/or an audio output of the second VCR 94, from a video and/or an audio output of the Direct Broadcast Satellite receiver 98, and the like in a similar manner in order to determine whether any of these local sources is the local source of the signals displayed by the television receiver 22'.

Also, various modes of the VCR 28 (and of the second VCR 94) can be determined by the arrangement of the present invention. FIG. 4 discloses in table form the operation of the present invention in order to monitor the modes of a VCR. As shown in FIG. 4, if the erase head of the VCR 28 is active, if the outputs of the VCR 28 and of the source scanning tuner 66 match, and if the outputs of the VCR 28 and of the television receiver 22' match, then it may be concluded that the VCR 28 is in the RECORD mode and that the program being recorded is also being viewed at the same time.

The operation of the erase head of the VCR 28 can be detected by the digital signal processing module 71 from a VCR erase detector 119 which is associated with the VCR 28. (Also, a VCR erase detector 120 may be associated with the second VCR 94.) The erase head detector 119 may be of the sort disclosed by Vitt, et al. Alternatively, the code reader 114 may be arranged to detect an artifact of the erase signal of the VCR 28 from the VCR audio output 56 of the VCR 28 by use of either the source audio multiplexer 86 or the reference audio multiplexer 88.

In order to determine if the outputs of the VCR 28 and of the source scanning tuner 66 match, the video outputs of the VCR 28 and of the source scanning tuner 66 may be correlated. For example, the digital signal processing module 71 may control the source video multiplexer 82 in order to pass the video signal on the video output 72 to the video signal conditioner circuit 111, the multiplexer 112, and the signature extraction portion 70', and the digital signal processing module 71 may control the reference video multiplexer 84 in order to pass the video signal on the VCR video output 58 to the video signal conditioner circuit 113, the multiplexer 118, and the signature extraction portion 70'. The signature extraction portion 70' and the signature correlating portion 70" of the digital signal processor 70 extracts and correlates video signatures from a video signal corresponding to a channel selected by the source scanning tuner 66 and from a video signal corresponding to a channel selected by the VCR 28. If these video signatures do not match, the controller 68 may step the source scanning tuner 66 through each of the channels until a match is found.

Alternatively, the digital signal processing module 71 may control the source audio multiplexer 86 in order to pass the audio signal on the audio output 74 to the multiplexer 112 and the signature extraction portion 70', and the digital signal processing module 71 may control the reference audio multiplexer 88 in order to pass the audio signal on the VCR audio output 56 to the multiplexer 118 and the signature extraction portion 70'. The signature extraction portion 70' and the signature correlating portion 70" of the digital signal processor 70 extracts and correlates audio signatures from the audio signal corresponding to a channel selected by the source scanning tuner 66 and from the audio signal corresponding to a channel selected by the VCR 28. If these audio signatures do not match, the controller 68 may step the source scanning tuner 66 through each of the channels until a match is found.

In order to determine if the outputs of the VCR 28 and of the television receiver 22' match, the video outputs of the VCR 28 and of the television receiver 22' may be correlated. The correlation of the outputs of the VCR 28 and of the television receiver 22' also can be determined by the digital signal processing module 71. For example, the digital signal processing module 71 may control the source video multiplexer 82 in order to pass the video signal on the video output 100 from the television receiver 22' to the video signal conditioner circuit 111, the multiplexer 112, and the signature extraction portion 70', and the digital signal processing module 71 may control the reference video multiplexer 84 in order to pass the video signal on the video output 58 of the VCR 28 to the video signal conditioner circuit 113, the multiplexer 118, and the signature extraction portion 70'. The signature extraction portion 70' and the signature correlating portion 70" of the digital signal processor 70 extracts and correlates video signatures from the video signal corresponding to a channel selected by the VCR 28 and the video signal corresponding to a channel selected by the television receiver 22'.

Alternatively, the digital signal processing module 71 may control the source audio multiplexer 86 in order to pass the audio signal on the audio output 108 from the television receiver 22' to the multiplexer 112 and the signature extraction portion 70', and the digital signal processing module 71 may control the reference audio multiplexer 88 in order to pass the audio signal on the audio output 56 of the VCR 28 to the multiplexer 118 and the signature extraction portion 70'. The signature extraction portion 70' and the signature correlating portion 70" of the digital signal processor 70 extracts and correlates audio signatures from the audio signal corresponding to a channel selected by the VCR 28 and the audio signal corresponding to a channel selected by the television receiver 22'.

If the television receiver 22' does not have output jacks so that the video output 100 and the audio output 108 are not present and so that the video signal pickup 62 and the audio signal pickup 64 are instead used to sense the video and audio signals of the television receiver 22', signatures from the video signals on the video output 58 of the VCR 28 and on the video signal pickup 62 of the television receiver 22' may be correlated in the manner described above, or signatures from the audio signals on the audio output 56 of the VCR 28 and on the audio signal pickup 64 of the television receiver 22' may be correlated in the manner described above.

As also shown in FIG. 4, if the erase head of the VCR 28 is active, if the outputs of the VCR 28 and of the source scanning tuner 66 match, and if the outputs of the VCR 28 and of the television receiver 22' do not match, then it may be concluded that the VCR 28 is in the RECORD mode, but that the program being recorded is not also being viewed on the television receiver 22' at the same time. The operation of the erase head of the VCR 28 can be detected as described above, the outputs of the VCR 28 and of the source scanning tuner 66 can be correlated as described above in order to determine that they match, and the outputs of the VCR 28 and of the television receiver 22' can be correlated as described above in order to determine that they do not match.

As shown in FIG. 4, if the erase head of the VCR 28 is not active, if the outputs of the VCR 28 and of the source scanning tuner 66 do not match, and if the outputs of the VCR 28 and of the television receiver 22' do match, then it may be concluded that the VCR 28 is in the PLAY mode. The operation of the erase head of the VCR 28 can be detected as described above, the outputs of the VCR 28 and of the source scanning tuner 66 can be correlated as described above in order to determine that they do not match, and the outputs of the VCR 28 and of the television receiver 22' can be correlated as described above in order to determine that they do match.

Again as shown in FIG. 4, if the erase head of the VCR 28 is not active, if the outputs of the VCR 28 and of the source scanning tuner 66 match, and if the outputs of the VCR 28 and of the television receiver 22' match, then it may be concluded that the VCR 28 is not recording or playing, but is instead being used to tune the television receiver 22', to fast forward a cassette (or tape), or to rewind a cassette (or tape). The use of the VCR 28 as a tuner may be credited by the program signal source detector 44. The operation of the erase head of the VCR 28 can be detected as described above, the outputs of the VCR 28 and of the source scanning tuner 66 can be correlated as described above in order to determine that they match, and the outputs of the VCR 28 and of the television receiver 22' can be correlated as described above in order to determine that they match.

As finally shown in FIG. 4, if the erase head of the VCR 28 is not active, if the outputs of the VCR 28 and of the source scanning tuner 66 do not match, and if the outputs of the VCR 28 and of the television receiver 22' also do not match, then it may be concluded that the VCR 28 is off. The operation of the erase head of the VCR 28 can be detected as described above, the outputs of the VCR 28 and of the source scanning tuner 66 can be correlated as described above in order to determine that they do not match, and the outputs of the VCR 28 and of the television receiver 22' can be correlated as described above in order to determine that they do not match. The digital signal processing module 71 may determine the on or off state of the television receiver 22' by detecting the presence or loss of a sync signal on the sync signal pickup 60.

Also, the arrangement of FIG. 3 may be used to identify programs being played by the VCR 28 or being displayed by the television receiver 22'. For example, video and/or audio program identifying ancillary codes contained in the program signal being recorded by the VCR 28 may be read by the code correlating portion 114" and may be stored in a memory of the digital signal processing module 71. The stored video and/or audio program identifying ancillary codes can be compared with those read by the code correlating portion 114" during the subsequent PLAY mode of the VCR 28 in order to determine if and when the recorded program signal is played back. The video and/or audio program identifying ancillary codes read by the code correlating portion 114" during either the RECORD mode or the subsequent PLAY mode of the VCR 28 may also be used to identify the programs being played in accordance with the teachings of the aforementioned U.S. Pat. No. 5,481,294.

If video and/or audio program identifying ancillary codes are not present in the signals being recorded and/or played, characteristic video and/or audio program signatures of the program signal being recorded by the VCR 28 may be extracted by the signature extraction portion 70' and may be stored in the memory of the digital signal processing module 71. The stored characteristic video and/or audio signatures can be compared by the signature correlating portion 70" with those extracted by the signature extraction portion 70' during a subsequent PLAY mode in order to determine if and when the recorded program signal is played back. If a match is found, the signatures extracted during play or recording may be compared to known signatures previously extracted from known programs by the local metering site 16 or by the source scanning tuner 66 in order to identify the recorded and/or played program in accordance with the teachings of the aforementioned U.S. Pat. No. 5,481,294.

Similarly, video and/or audio program identifying ancillary codes of a program signal tuned by the tuner of the television receiver 22' may be read by the code correlating portion 114" at the video and/or audio outputs of the television receiver 22'. The video and/or audio program identifying ancillary codes may be used to identify the programs displayed by the television receiver 22' in accordance with the teachings of the aforementioned U.S. Pat. No. 5,481,294. If video and/or audio program identifying ancillary codes are not present in the signals at the output of the television receiver 22', characteristic video and/or audio program signatures of the program signal at the output of the television receiver 22' may be extracted by the signature extraction portion 70'. These signatures may be compared to known signatures previously extracted from known programs by the local metering site 16 or by the source scanning tuner 66 in order to identify the displayed program in accordance with the teachings of the aforementioned U.S. Pat. No. 5,481,294.

Programs being recorded and/or played by the second VCR 94, games from the video game 26 being displayed by the television receiver 22', and programs from the Direct Broadcast Satellite receiver 98 being displayed by the television receiver 22', may be similarly identified through the use of program identifying ancillary codes and characteristic program signatures. It should be noted, however, that the playing of rented or purchased cassettes (or tapes) is often more common than playing back time-shifted, previously recorded programs. Accordingly, it is expected that most attempts to use characteristic program signatures in order to identify programs being played on the VCR 28 will fail to yield an identifying match. However, program identifying ancillary codes are frequently added to pre-recorded cassettes (or tapes) so that, in those cases, the program signal source detector 44 installed in the statistically selected household 14 will still be able to identify the program being played by the VCR 28.

Certain modifications of the present invention have been discussed above. Other modifications will occur to those practicing in the art of the present invention. For example, although the present invention has been specifically described in connection with a television audience measurement system, the present invention may be used in connection with other systems such as program verification systems.

Also, although the present invention has been described in connection with the monitoring of television receivers, the present invention may be used in connection with the monitoring of other receivers, such as radio receivers.

Similarly, although the present invention has been described in connection with monitoring VCRs, the present invention may be used in connection with monitoring other recording and/or playing equipment such as disk players, audio cassette and disk recorders/players, and the like, and in connection with signal sources that are less complex than VCRs and like equipment.

Moreover, as described above, the signature correlating portion 70" of the digital signal processor 70 and the code correlating portion 114" of the code reader 114 are located in the statistically selected household 14. However, the signature correlating portion 70" and the code correlating portion 114" instead may be located in the central site 18.

Furthermore, as described above, signatures are extracted from an output of the television receiver 22' and from an output of a local source of program signals, and these signatures are correlated in order to identify the source as the source of the signals being displayed by the television receiver 22'. These signatures may be exact analog or digital representations of the relevant programs signals so that the output of the television receiver 22' and the output of a source to be identified as the source of the program signals being displayed by the television receiver 22' may be directly correlated either in analog form or in digital form without the necessity of sampling the program signals. Alternatively, the signatures may be sampled representations of the relevant programs signals.

Figure 5:
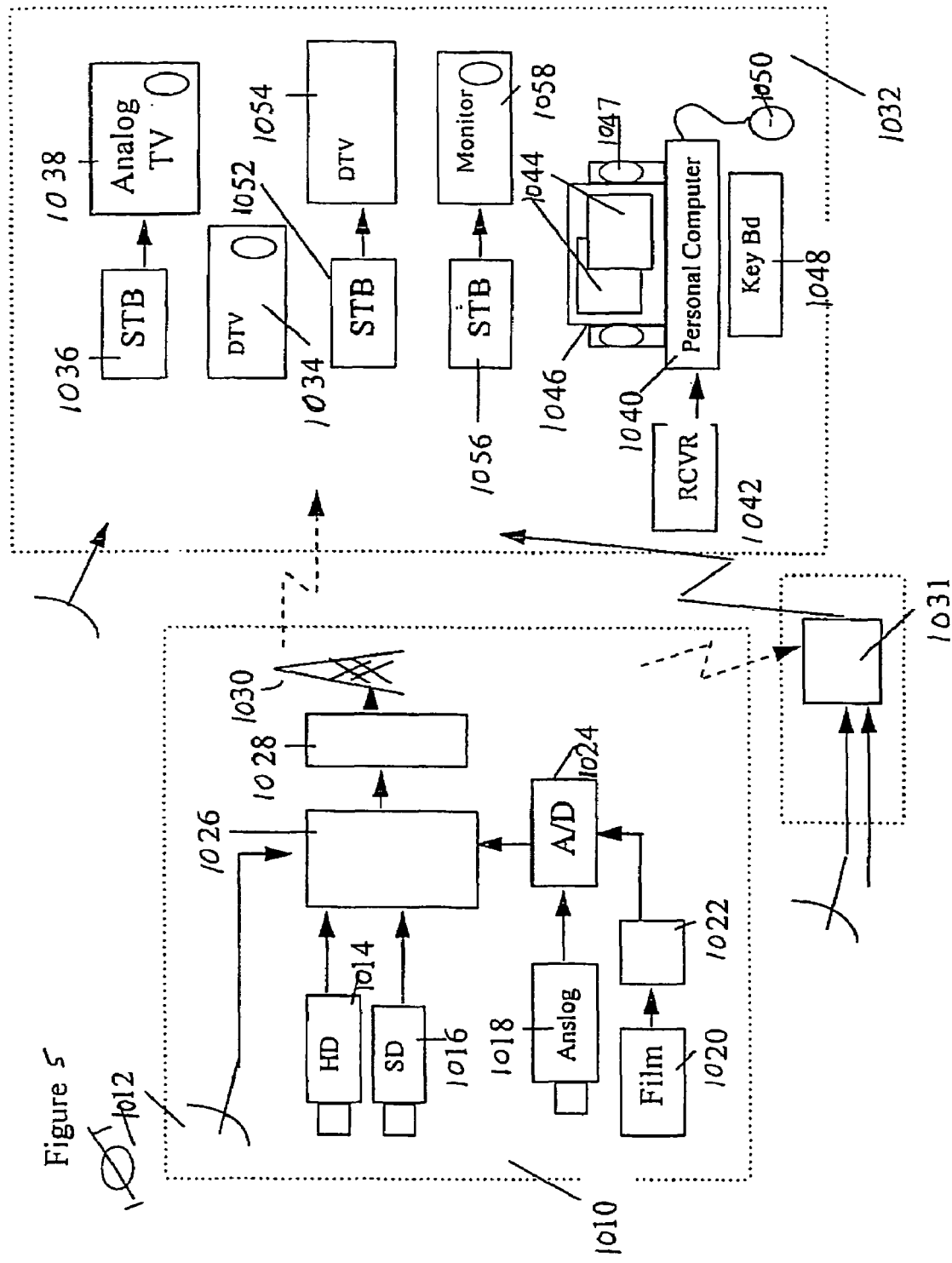
FIG. 5 is a schematic block diagram depicting typical digital television broadcasting and reception equipment.

A typical digital television broadcasting environment, which is planned during a transition period in which both digital and analog programs are transmitted, may comprise some combination of the elements depicted in FIG. 5. Network programming, and other non-local programming, is provided to a local television station 1010 from a broadcast station over a communication medium 1012, such as a satellite, or terrestrial digital transmission lines, or the like. Local programming is also provided to the local television station 1010 from some mixture of high definition television (HDTV) cameras 1014 (which may employ a variety of formats), standard definition digital video cameras 1016 (which may employ a variety of resolutions and aspect ratios), and analog sources comprising both analog video cameras 1018 (e.g., those compatible with the prior generation NTSC broadcast standard), and cinema film sources 1020 that have historically been converted to the NTSC standard by means of well known telecine 1022.

The signals from the analog video cameras 1018 and from the cinema film sources 1020 are input to an A/D converter 1024 having an appropriate digital output. The outputs from the A/D converter 1024, from the communication medium 1012, from the high definition television (HDTV) cameras 1014, and/or from the standard definition digital video cameras 1016 are provided to a switching and routing apparatus 1026. The switching and routing apparatus 1026 passes selected ones of the signals provided to it through digital compression equipment 1028 prior to being broadcast from the station's transmitter 1030. The station's transmitter 1030 may also include an antenna, a satellite dish, a cable modem, or the like.

In addition, a cable headend 1031 (which is shown as a single cable provider but which may represent a plurality of cable providers) receives signals over the air, from satellite distribution, or the like, and distributes the signals (with or without reformatting) by way of regular cables, optical fibers, microwaves, or the like.

The digital transmission from the local television station 1010 and/or from the cable headend 1031 may be directly received and displayed in a statistically selected monitoring site 1032 by a digital television set 1034. The digital transmission also may be directly received and converted by a digital converter 1036 (commonly configured as a set top box or STB) into an analog output (e.g., in the NTSC format) for use by an analog television set 1038 purchased by a viewer prior to the change-over to digital programming. The digital transmission further may be directly received and displayed by a personal computer 1040 that has a digital receiver 1042 providing a baseband video output signal that the personal computer 1040 can show in one of the windows 1044 defined on its display unit 1046. The digital receiver 1042, for example, could be a plug in board of the personal computer 1040 or integrated on the motherboard. The personal computer also may have speakers 1047, a keyboard 1048, and a mouse 1050 or other pointing device known in the art.

Moreover, the digital transmission may be directly received and converted by a digital converter 1052 to a form useable by a digital television set 1054. For example, the digital converter 1052 may be used for pay-per-view television programming, video-on-demand television programming, satellite programs, and/or other services provided to the statistically selected monitoring site 1032. The digital transmission also may be directly received and converted by a digital converter 1056 to a form useable by a simple monitor 1058. In either of these two cases, the digital television viewing can be measured by means of metering technologies similar to the set top box and an analog television configuration described below.

In addition to the direct reception of the digital transmission by apparatus dedicated solely to that purpose (e.g., the digital television set 1034 and/or the personal computer 1040), it is expected that a variety of yet-to-be-defined consumer electronic apparatuses will be configured that incorporate at least some of the features of both a digital or analog television receiver and a home computer.

Figure 6:
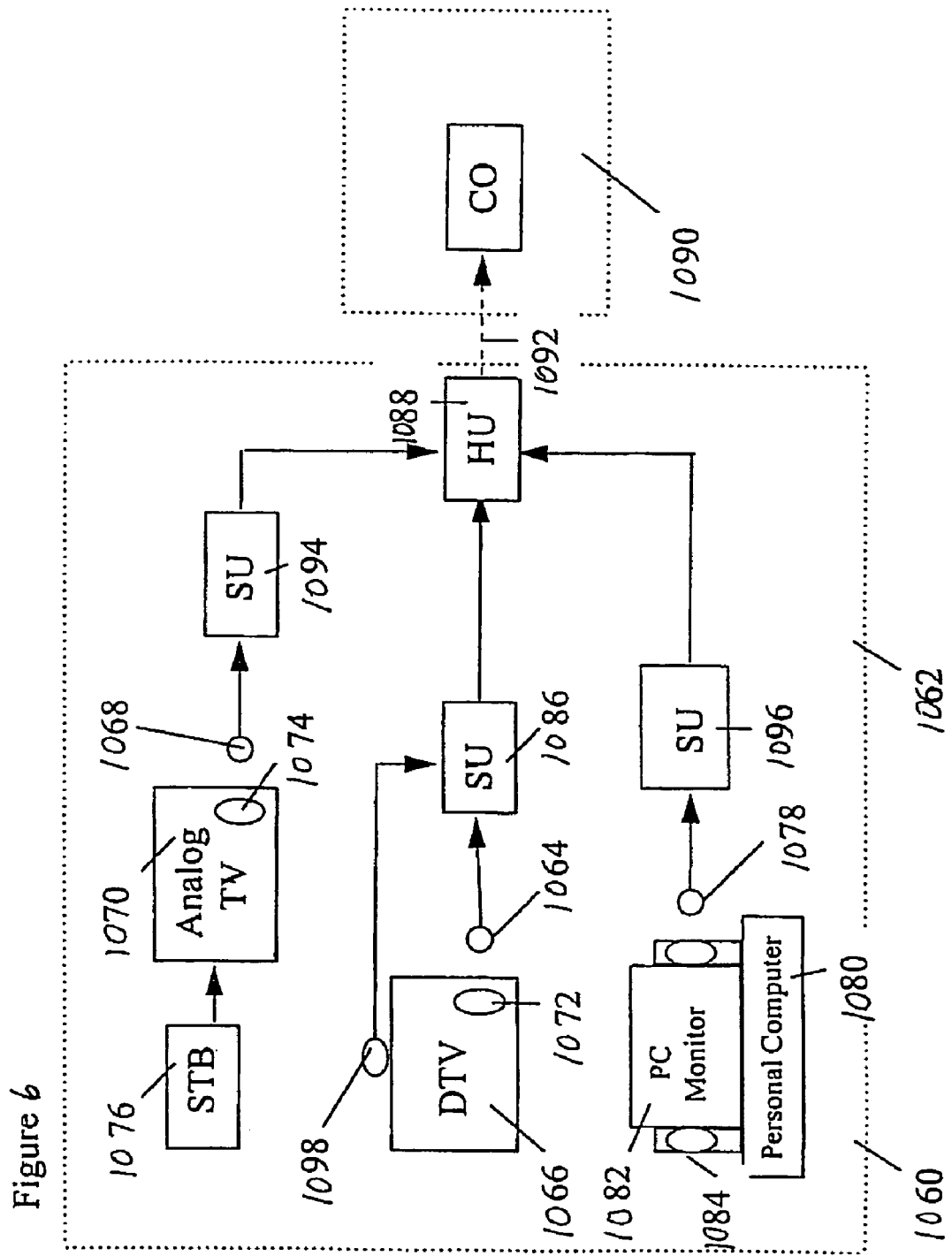
FIG. 6 is a schematic block diagram depicting a second example system employing an audio-based tuning measurement system which is usable with either digital or analog broadcasting to monitor the reception of programs and content by broadcast receivers.

A second example system 1060 to monitor the reception of programs and content by broadcast receivers, which measures tuning to digital television programming received in a statistically selected monitoring site 1062, is depicted schematically in FIG. 6. The example system 1060 measures such tuning by detecting program identification codes and/or extracting signatures from the audio portion of the television signal to which a receiver is tuned. This audio portion is detected by a detector 1064 in the case of a digital television set 1066, and by a detector 1068 in the case of an analog television set 1070. The detector 1064 may detect the audio portion of a program to which the digital television set 1066 is tuned by non-intrusively detecting the sound provided by a speaker 1072 of the digital television set 1066 (in which case the detector 1064 may be a microphone) or by intrusively detecting the audio signal from a direct connection to the speaker, the audio output terminals, or the audio processing circuitry of the digital television set 1066. Similarly, the detector 1068 may detect the audio portion of a program to which the analog television set 1070 is tuned by non-intrusively detecting the sound provided by a speaker 1074 of the digital television set 1066 or by intrusively detecting the audio signal from a direct connection to the speaker, the audio output terminals, or the audio processing circuitry of the analog television set 1070. The analog television receiver 1070 is provided with a digital converter 1076, which may be similar to the digital converter 1036 of FIG. 5.

The audio portion of a television program may also be detected by a detector 1078 when the television program is played by a personal computer 1080 on a monitor 1082 and speakers 1084. The detector 1078 may detect the audio portion of a program to which the personal computer 1080 is tuned by non-intrusively detecting the sound provided by the speakers 1084 or by intrusively detecting the audio signal from a direct connection to the speaker, the audio output terminals, or the audio processing circuitry of the personal computer 1080.

As has been taught by Thomas, et al., in U.S. Pat. No. 5,629,739, a representation of the audio portion picked up by the detector 1064 can be analyzed by a site unit (SU) 1086 and/or a home unit (HU) 1088 (which may be provided with data storage and forwarding unit capability) within the statistically selected monitoring site 1062 in order to determine if the audio portion from the digital television set 1066 contains television program identification codes. Alternatively, the representation of the audio portion picked up by the detector 1064 can be analyzed at a remotely located data collection central office 1090 in order to determine if the audio portion from the digital television set 1066 contains such television program identification codes. The remotely located data collection central office 1090 is schematically depicted as a computer based data collection central office that interchanges data with the home unit 1088 over a communication network 1092, such as a public switched telephone network, the Internet, or the like.

Similarly, a representation of the audio portion picked up by the detector 1068 can be analyzed by a site unit 1094 and/or the home unit 1088 in order to determine if the audio portion from the analog television set 1070 contains television program-identifying codes, and a representation of the audio portion picked up by the detector 1078 can be analyzed by a site unit 1096 and/or the home unit 1088 in order to determine if the audio portion from the personal computer 1080 contains television program-identifying codes. Alternatively, the representation of the audio portions picked up by the detectors 1068 and 1078 can be analyzed at the remotely located data collection central office 1090 in order to determine if the audio portions from the analog television set 1070 and the personal computer 1080 contain television program identification codes.

Moreover, a person identifier 1098 may be provided in order to identify the persons watching television programming on the digital television set 1066. The person identifier 1098 may be video camera, an IR camera, or the like. When such equipment is available in the statistically selected monitoring site 1062, the site unit 1086 may employ known head location and face recognition software (e.g., as taught by Lu in U.S. Pat. No. 4,858,000) for the identification of the viewing persons and for the collection of other demographic data. Similarly, person identifiers may be provided in order to identify the persons watching television programming on the analog television set 1070 and on the personal computer 1080.

Instead of analyzing the representations of the audio portions picked up by the detectors 1064, 1068, and 1078 in order to determine if the audio portions from the corresponding digital television set 1066, analog television set 1070, and personal computer 1080 contain television program-identifying codes, characteristic signatures can be extracted from these representations for subsequent comparison, either in the statistically selected monitoring site 1062 or in the central office 1090, with previously collected reference signatures in order to identify the television programs to which the digital television set 1066, the analog television set 1070, and the personal computer 1080 are tuned.

Programs played by VCRs on the digital television set 1066, on the analog television set 1070, and on the personal computer 1080 can be identified using either the code or the signature technique. Thus, if the programs being played carry program identification codes that are preserved through the process of recording and replay in the case of time shifted viewing, or that are recorded in the programs stored on tapes to be rented or sold, the program identification codes can be detected at the time that the programs are played so that the audiences of the programs may be measured. However, if the programs being played are non-encoded programs, or if the program identification codes are lost (e.g., during the recording process), then the examples of the present invention described herein can determine the programs being viewed, when the tapes are played, by extracting characteristic signatures from these programs and by matching the extracted signatures to reference signatures stored in a reference signature database. In this case, searching can be optimized by the use of well known hashing techniques.

Although the present invention may use either the code technique or the signature technique in order to measure audiences of programs played on digital television equipment, the present invention may use both of these two techniques so that one of the techniques backs up the other in the event that the one technique is unable to identify a viewer selected television program. For example, signatures are extracted and matched in order to identify a viewer selected television program only if identifying codes cannot be detected. As a further alternative, the present invention may use both of these two techniques simultaneously. Demographic data may also be collected in connection with the present invention.

It may be noted that, although the example system 1060 measures the great majority of the overall audience, it is not arranged to measure interactive features (e.g., co-transmitted advertising detail) that are expected to be part of the digital broadcasting environment. Therefore, an important feature of the following example is that it measures interactive features.

Figure 7:
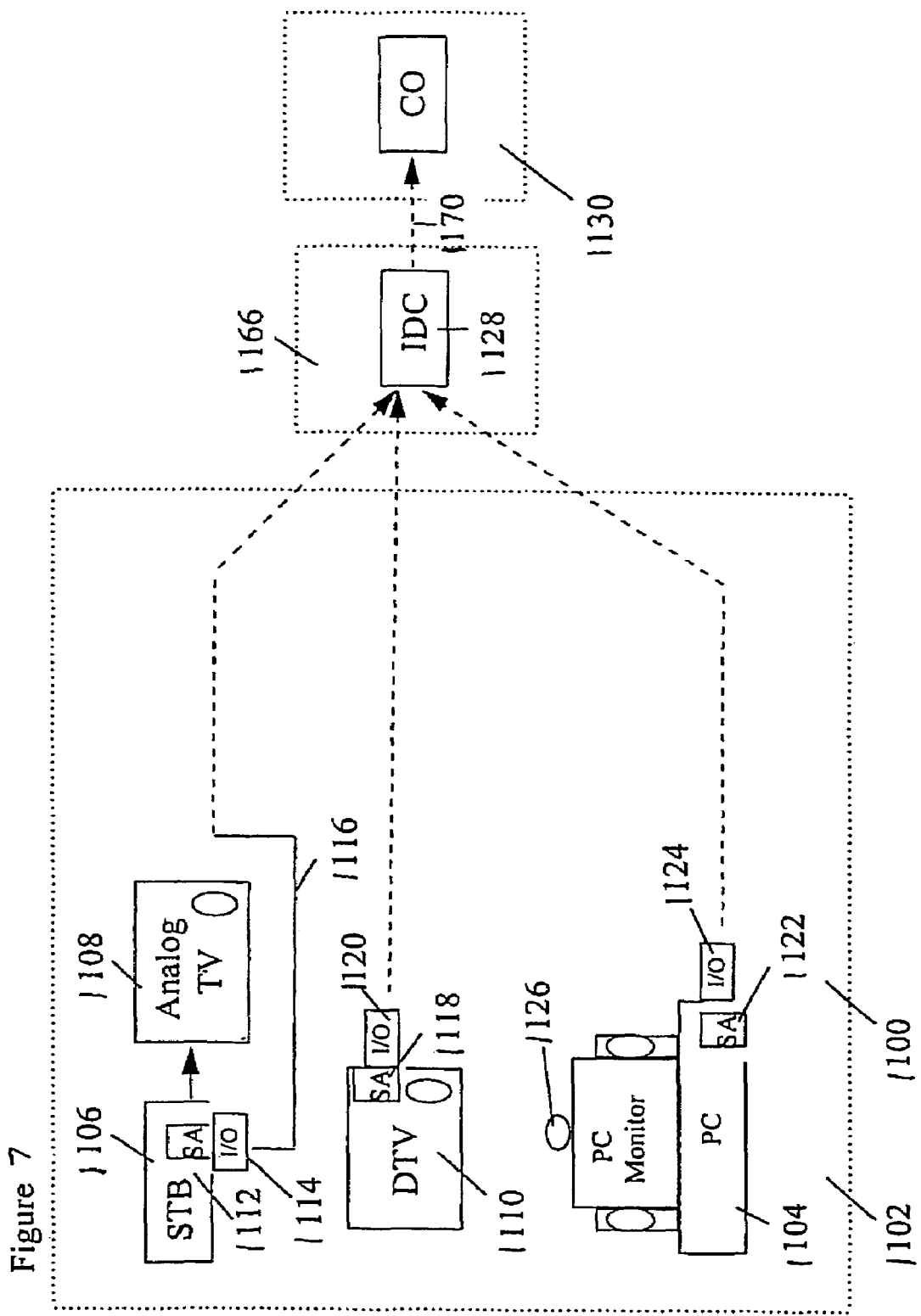
FIG. 7 is a schematic block diagram depicting a third example system employing a software agent resident in some of the monitored receiving equipment to monitor the reception of programs and content by broadcast receivers.

Accordingly, a third example system 1100 to monitor the reception of programs and content by broadcast receivers is provided as shown in FIG. 7. The example system 1100 measures tuning to digital television programming in connection with a statistically selected monitoring site 1102. As will be apparent from the discussion below, this example system 1100 may include some or all of the features of the example system 1060, as well as the new features described below in connection with the example system 1100.

According to this example system 1100, tuning data, and possibly demographic data, are collected from digital television reception equipment that includes processing equipment preferably having adequate non-volatile or battery-backed memory available so that an algorithm, hereinafter referred to as a software agent, can be stored thereon. The digital television reception equipment of the example system 1100 may include (i) a personal computer 1104 which may be similar to the personal computer 1040 of FIG. 5, (ii) a digital converter 1106 which may be similar to the digital converter 1036 of FIG. 5, (iii) an analog television set 1108 operating in response to the digital converter 1106, and (v) a digital television set 1110.

One or more software agents of the example system 1100, as disclosed in greater detail hereinafter, monitor operating tasks in order to create time-stamped records containing tuning and/or other data regarding operation of the particular pieces of equipment in which the software agents are resident. Such monitored operating tasks may be, for example, messages passed from a remote or other control operated by a user to a tuner or other program selector in order to select a television program being broadcast in a channel, messages passed from a controller of processing equipment to a tuner in order to select a television program being broadcast in a channel, or the like. Although software agents are expected to be able to effectively eavesdrop on data traffic passing though their hosts' data ports, the use of software agents would not fully measure tuning at viewing sites unless each item of television equipment at those sites has a respective software agent within it so that a complete set of operating tasks can be captured.

Accordingly, a software agent 1112 is included in the digital converter 1106. The software agent 1112 monitors operating tasks in order to create time-stamped records containing tuning and/or other data regarding operation of the digital converter 1106 in which the software agent 1112 is resident. Thus, the software agent 1112 detects, for example, a message relating to selection of a television program being broadcast in a selected channel. From this detected message, the identity of the selected television program may be determined. The software agent 1112 is also arranged to eavesdrop on data traffic passing though its host's input/output data port 1114, and to communicate over the input/output data port 1114. Accordingly, programs to which the analog television set 1108 is tuned may be detected through use of the software agent 1112. The software agent 1112 may be downloaded over a communication medium 1116 to the digital converter 1106 by use of the input/output data port 1114. Alternatively, the software agent 1112 may be a plug in, may be resident on a floppy disk, or the like.

Similarly, a software agent 1118 is included in the digital television set 1110. The software agent 1118 monitors operating tasks associated with the digital television set 1110 in order to create time-stamped records containing tuning and/or other data regarding operation of the digital television set 1110 in which the software agent 1118 is resident. The software agent 1118 is also arranged to cooperate with its host's input/output data port 1120. A software agent 1122 is included in the personal computer 1104. The software agent 1122 monitors operating tasks associated with the personal computer 1104 in order to create time-stamped records containing tuning and/or other data regarding operation of the personal computer 1104 in which the software agent 1122 is resident. The software agent 1122 is also arranged to cooperate with its host's input/output data port 1124.

Moreover, a person identifier 1126 may be provided in order to identify the persons watching television programming on the personal computer 1104. As in the case of the person identifier 1098, the person identifier 1126 may be video camera, an IR camera, or the like, and may be provided with any or all of the viewing equipment shown in FIG. 7.

The software agents 1112, 1118, and 1122 may be telecommunication enabled so that television audience data from all the viewing sites in the statistically selected monitoring site 1102 can be communicated, via the Internet, a public telephone system, or the like, to a locally located or remotely located intermediate data collector 1128 and then to a remotely located central office 1130 through a communication channel 1170. The intermediate data collector 1128 can be flexibly located either at the same statistically selected monitoring site 1102, or at a remotely located site 1166, or at the central office 1130. For this purpose, the input/output data ports 1114, 1120, and 1124 may be serial ports, parallel ports, universal serial buses (USB), firewires (according to IEEE 11394), or the like. The data transfer may, for example, be structured as a background task and take the form of a sequence of data packets, each of which is e-mailed or otherwise communicated to the remotely located intermediate data collector 1128 during pauses in a user's on line sessions or at any other time. The intermediate data collector 1128, for example, may be a computerized data collector or an Internet service provider. Alternatively, the intermediate data collector 1128 may be a home unit, in which case, the intermediate data collector 1128 may be located within the statistically selected monitoring site 1102 and may itself be arranged to communicate tuning and demographic data via e-mail or other communication to the central office 1130.

The software agent 1122 additionally may monitor the personal computer 1104 for interactive uses such as Internet usage (e.g., through logging of Universal Resource Locators, URLs), application software usage, and television viewing supported by the personal computer 1104. Similarly, to the extent that the digital converter 1106 and the digital television set 1110 are web-enabled, the software agents 1114 and 1118 may monitor interactive uses such as Internet usage (e.g., through logging of URLs) and application software usage, as well as television viewing.

Because not all equipment that is encountered by a research firm doing television audience research, at least during the early part of the digital television broadcasting era, will be compatible with the software agent approach discussed above, the example system 1100 may be arranged to include many or all of the features found in the example system 1060 of FIG. 6.

As described above, the example system 1060 measures the great majority of the overall audience by detecting the programs to which receivers are tuned by detecting program identification codes embedded in the programs, and/or by extracting signatures of the programs being viewed and by comparing the extracted signatures to reference signatures. Moreover, the example system 1100 of FIG. 7 measures not only the overall audience, but also interactive features provided with the programming. The example systems described below are specifically arranged to measure, in an efficient manner, the digital television viewing data where multiple television programs are present in a common digital transmission channel (e.g., of 6 MHZ), particularly where a digital television set does not have an accessible operating system with which a software agent can reside. The example system 1060 of FIG. 6 is also useful where there is no I/O interface on the television set so that there is no easy way to read data from the television set.

Figure 8:
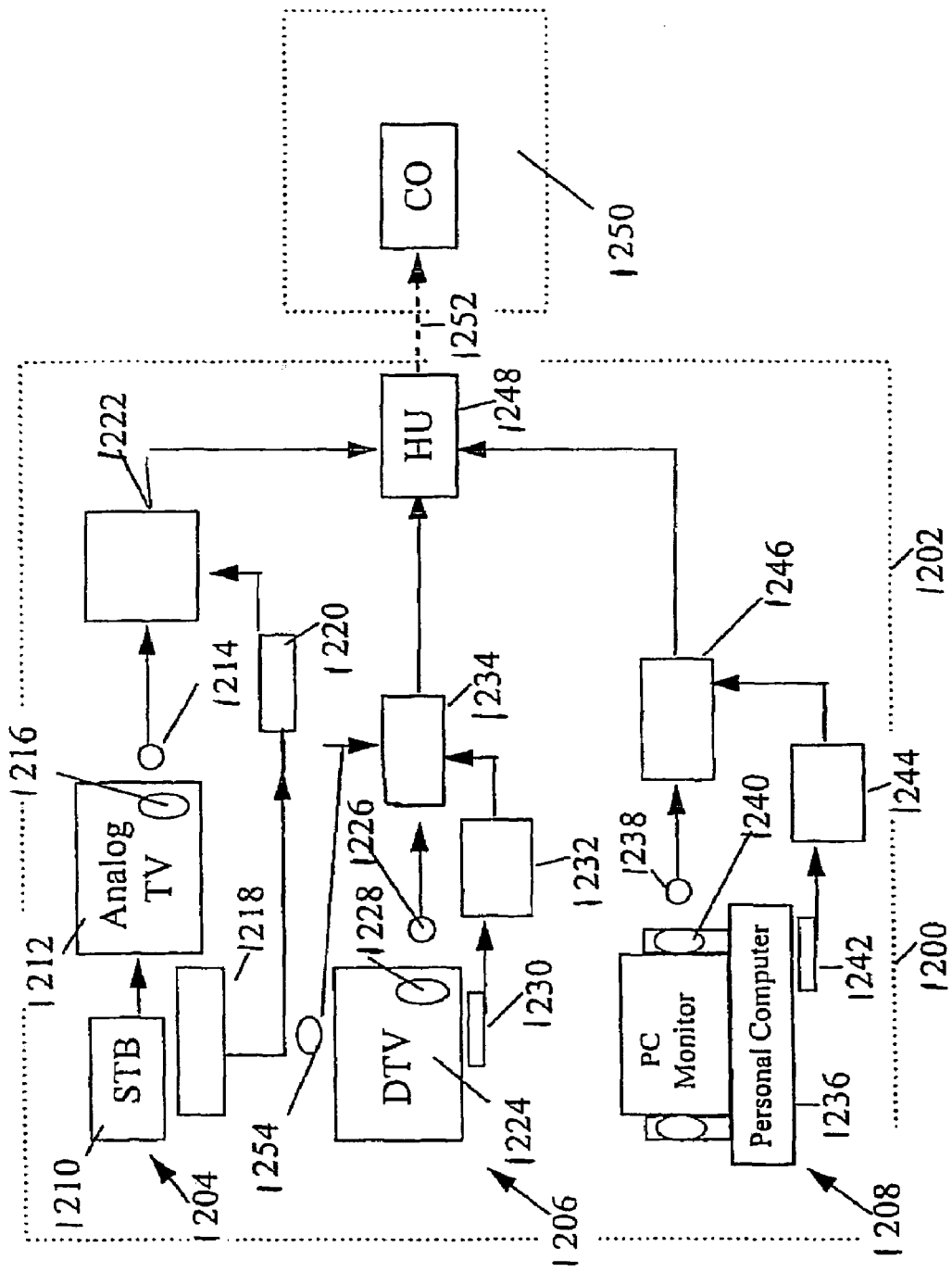
FIG. 8 is a schematic block diagram depicting a fourth example system employing digital source detection to monitor the reception of programs and content by broadcast receivers.

FIG. 8 depicts a fourth example system 1200 to monitor the reception of programs and content by broadcast receivers in which a statistically selected monitoring site 1202, during the transition period when both analog and digital broadcasting occur, includes, for example, a first viewing site 1204, a second viewing site 1206, and a third viewing site 1208. The first viewing site 1204 includes a digital converter 1210 connected to an analog television set 1212. The audio portion of a program to which the analog television set 1212 is tuned is detected by a detector 1214. The detector 1214 may detect this audio portion by non-intrusively detecting the sound provided by a speaker 1216 of the analog television set 1212 or by intrusively detecting the audio signal from a direct connection to the analog television set 1212.

A probe 1218 is provided to detect the intermediate frequency signal of the digital converter 1210. A signal processor 1220 demodulates the detected intermediate frequency signal to the baseband bit stream contained in the detected intermediate frequency signal, and then demultiplexes the baseband bit stream to recover the audio portion of the baseband bit stream.

A comparator 1222 may be arranged to first determine whether there is a program identification code in the audio detected by the detector 1214. If there is a program identification code in the audio detected by the detector 1214, this program identification code identifies the program to which the analog television set 1212 is tuned and is, therefore, logged. If there is no program identification code in the audio detected by the detector 1214, the comparator 1222 then scans the audio portion of the baseband bit stream provided by the signal processor 1220 in order to detect the audio in a first program contained in the intermediate frequency signal detected by the probe 1218. The comparator 1222 compares this audio to the audio data from the detector 1214. If there is a match, the program to which the digital converter 1210 is tuned is known from the information provided by the signal processor 1220. If there is no match, the comparator 1222 then scans the audio portion of the baseband bit stream provided by the signal processor 1220 in order to detect the audio in a second program contained in the intermediate frequency signal detected by the probe 1218, and so on until the comparator 1222 detects a match. Once a match is found, the major and minor channel numbers of the matched channel are known, and the corresponding program identifying ancillary code can be read from the corresponding data packet.

The second viewing site 1206 includes a digital television set 1224. The audio portion of a program to which the digital television set 1224 is tuned is detected by a detector 1226. The detector 1226 detects this audio portion by non-intrusively detecting the sound provided by a speaker 1228 of the digital television set 1224 or by intrusively detecting the audio signal from a direct connection to the digital television set 1224.

A probe 1230 is provided to detect the intermediate frequency signal of the digital television set 1224. A signal processor 1232 operates similarly to the signal processor 1220 in order to provide the audio portion of the baseband bit stream in the intermediate frequency signal detected by the probe 1230. A comparator 1234 operates similarly to the comparator 1222 in order to first determine whether there is a program identification code in the audio detected by the detector 1226 and, if there is not, to scan the audio portion of the baseband bit stream provided by the signal processor 1232 until a match is found.

The third viewing site 1208 includes a personal computer 1236. The audio portion of a program to which the personal computer 1236 is tuned is detected by a detector 1238. The detector 1238 detects this audio portion by non-intrusively detecting the sound provided by speakers 1240 of the personal computer 1236 or by intrusively detecting the audio signal from a direct connection to the personal computer 1236.

A probe 1242 is provided to detect the intermediate frequency signal of the personal computer 1236. A signal processor 1244 operates similarly to the signal processor 1220 in order to provide the audio portion of the baseband bit stream in the intermediate frequency signal detected by the probe 1242. A comparator 1246 operates similarly to the comparator 1222 in order to first determine whether there is a program identification code in the audio detected by the detector 1238 and, if there is not, to scan the audio portion of the baseband bit stream provided by the signal processor 1244 until a match is found.

The comparators 1222, 1234, and 1246 provide their program identification codes from the audio or from the data packet, and/or match information to a home unit 1248, which may be provided with data storage and forwarding unit capability, within the statistically selected monitoring site 1202. A remotely located data collection central office 1250 is schematically depicted as a computer based data collection central office that interchanges data with the home unit 1248 over a communication network 1252, such as a public switched telephone network, the Internet, or the like. Moreover, a person identifier 1254 may be provided in order to identify the persons watching television programming on the digital television set 1224. As in the case of the person identifier 1098, the person identifier 1254 may be video camera, an IR camera, or the like, and may be provided for any or all of the viewing equipment shown in FIG. 8.

Alternatively, instead of using intermediate frequency probes for the probes 1218, 1230, and 1242, local oscillator probes may be used. A local oscillator probe may be employed to initially identify the channel tuned by its associated television receiver, which offers a significant speed advantage in the measurement. That is, because channel detection apparatus normally operates much faster than does audio signal comparison apparatus, the program determination process can be carried out in a hierarchical fashion in which the broadcast channel is first determined from the local oscillator signal by the signal processors 1220, 1232, and 1244 (assuming that a program identification code is not first detected). Then, the comparators 1222, 1234, and 1246 sequentially tune to the programs co-transmitted in the detected broadcast channel and compare the audio portion of the tuned program to the audio data from detectors 1214, 1226, and 1238 in order to identify the program in the broadcast channel. In this way, the comparators 1222, 1234, and 1246 are not required to sequentially tune through all of the programs in all of the available channels in order to determine the tuned program.

Figure 9:
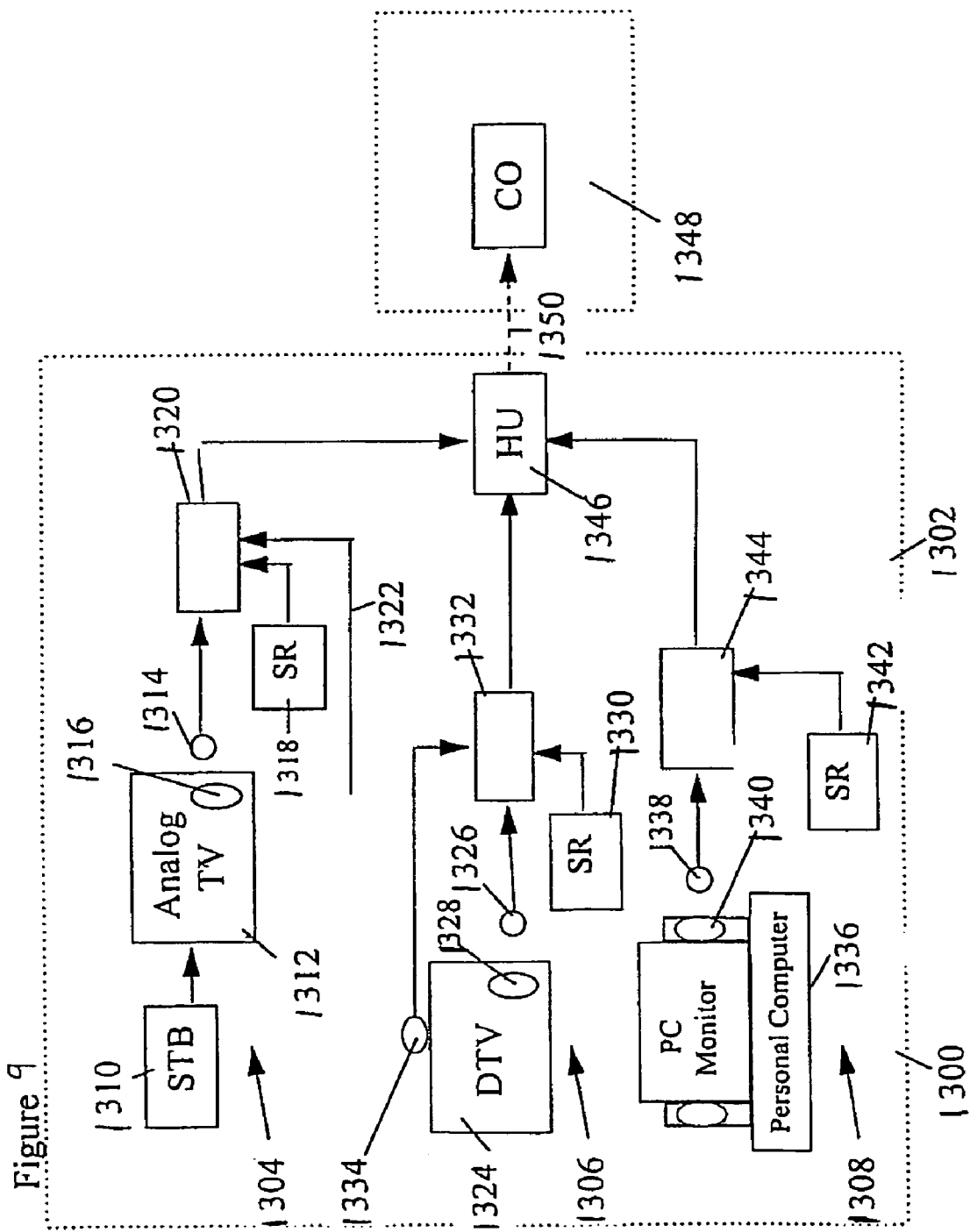
FIG. 9 is a schematic block diagram depicting a fifth example system employing the use of digital source detection to monitor the reception of programs and content by broadcast receivers.

A still further alternative is provided by a fifth example system 1300 to monitor the reception of programs and content by broadcast receivers shown in FIG. 9. The example system 1300 is used in a statistically selected monitoring site 1302 having a first viewing site 1304, a second viewing site 1306, and a third viewing site 1308. The first viewing site 1304 includes a digital converter 1310 connected to an analog television set 1312. The audio portion of a program to which the analog television set 1312 is tuned is detected by a detector 1314. The detector 1314 may detect this audio portion by non-intrusively detecting the sound provided by a speaker 1316 of the analog television set 1312 or by intrusively detecting the audio signal from a direct-connection to the audio processing circuitry of the analog television set 1312.

A scanning receiver 1318 is arranged to sequentially tune to each of the programs carried in each broadcast channel to which the digital converter 1310 may be tuned, and to provide an audio portion of each such program to a comparator 1320. The comparator 1320 may be arranged to first determine whether there is a program identification code in the audio detected by the detector 1314. If there is a program identification code in the audio detected by the detector 1314, this program identification code is logged because it identifies the program to which the analog television set 1312 is tuned. If there is no program identification code in the audio detected by the detector 1314, the comparator 1320 then compares the audio portion of a first program provided by the scanning receiver 1318 to the audio data from the detector 1314. If there is a match, the program to which the digital converter 1310 is tuned is known from the information provided by the scanning receiver 1318. Once a match is found, the major and minor channel numbers of the matched channel are known, and the corresponding program identifying ancillary code can be read from the corresponding data packet.

If there is no match, the comparator 1320 compares the audio portion of a second program provided by the scanning receiver 1318 to the audio data from the detector 1314, and so on until the comparator 1320 detects a match. A demographic input 1322 may be used to provide demographic data to the comparator 1320 which couples this demographic data, and time, with the program to which the digital converter 1310 is tuned as a tuning record. The demographic input 1322, for example, may be the well known Peoplemeter with which people currently identify themselves manually when they are viewing a program displayed on a television set.

The second viewing site 1306 includes a digital television set 1324. The audio portion of a program to which the digital television set 1324 is tuned is detected by a detector 1326. The detector 1326 detects this audio portion by non-intrusively detecting the sound provided by a speaker 1328 of the digital television set 1324 or by intrusively detecting the audio signal from a direct connection to the digital television set 1324.

A scanning receiver 1330 is arranged to sequentially tune to each of the programs carried in each broadcast channel to which the digital television set 1324 may be tuned, and to provide an audio portion of each such program to a comparator 1332. The comparator 1332 may be arranged to first determine whether there is a program identification code in the audio detected by the detector 1326. If there is a program identification code in the audio detected by the detector 1326, this program identification code is logged because it identifies the program to which the digital television set 1324 is tuned. If there is no program identification code in the audio detected by the detector 1326, the comparator 1332 then compares the audio portion of a first program provided by the scanning receiver 1330 to the audio data from the detector 1326. If there is a match, the program to which the digital television set 1324 is tuned is known from the information provided by the scanning receiver 1330. If there is no match, the comparator 1332 compares the audio portion of a second program provided by the scanning receiver 1330 to the audio data from the detector 1326, and so on until the comparator 1332 detects a match.

Moreover, a person identifier 1334 may be provided in order to identify the persons watching television programming on the digital television set 1224. As in the case of the person identifier 1098, the person identifier 1254 may be video camera, an IR camera, or the like, and may be provided for any or all of the viewing equipment shown in FIG. 9. The comparator 1332 couples the identities of the persons watching the digital television set 1324, and time, with the program to which the digital television set 1324 is tuned as a tuning record.

The third viewing site 1308 includes a personal computer 1336. The audio portion of a program to which the personal computer 1336 is tuned is detected by a detector 1338. The detector 1338 detects this audio portion by non-intrusively detecting the sound provided by speakers 1340 of the personal computer 1336 or by intrusively detecting the audio signal from a direct connection to the personal computer 1336.

A scanning receiver 1342 is arranged to sequentially tune to each of the programs carried in each broadcast channel to which the personal computer 1336 may be tuned, and to provide an audio portion of each such program to a comparator 1344. The comparator 1344 may be arranged to first determine whether there is a program identification code in the audio detected by the detector 1338. If there is a program identification code in the audio detected by the detector 1338, this program identification code is logged because it identifies the program to which the personal computer 1336 is tuned. If there is no program identification code in the audio detected by the detector 1338, the comparator 1344 then compares the audio portion of a first program provided by the scanning receiver 1342 to the audio data from the detector 1338. If there is a match, the program to which the personal computer 1336 is tuned is known from the major and minor channel numbers indicated by the match. If there is no match, the comparator 1344 compares the audio portion of a second program provided by the scanning receiver 1342 to the audio data from the detector 1338, and so on until the comparator 1344 detects a match. The comparator 1344 couples time with the program to which the personal computer 1336 is tuned as a tuning record.

The comparators 1320, 1332, and 1344 provide their tuning records to a home unit 1346, which may be provided with data storage and forwarding unit capability, within the statistically selected monitoring site 1302. A remotely located data collection central office 1348 is schematically depicted as a computer based data collection central office that interchanges data with the home unit 1346 over a communication network 1350, such as a public switched telephone network, the Internet, or the like.

It is likely that many, if not all, digital television sets, digital converters, and like digital equipment will have data ports that will provide output viewer-selected program information for use in consumer devices connected to the data ports. In connection with digital televisions, a data port is likely to provide, for example, the full major channel ATSC bitstream and information on virtual channels that may include analog or digital major channel selection, program (minor channel) selection, physical source (TV, VCR, DVD, etc.) identification, and the like. In connection with digital converters (i.e., set top boxes), a data port is likely to provide, for example, the full ATSC bitstream and information on virtual channels that may include analog or digital major channel selection, program (minor channel) selection, vertical blanking interval data reinserted on the correct line and field of analog signals, and the like.

Figure 10:
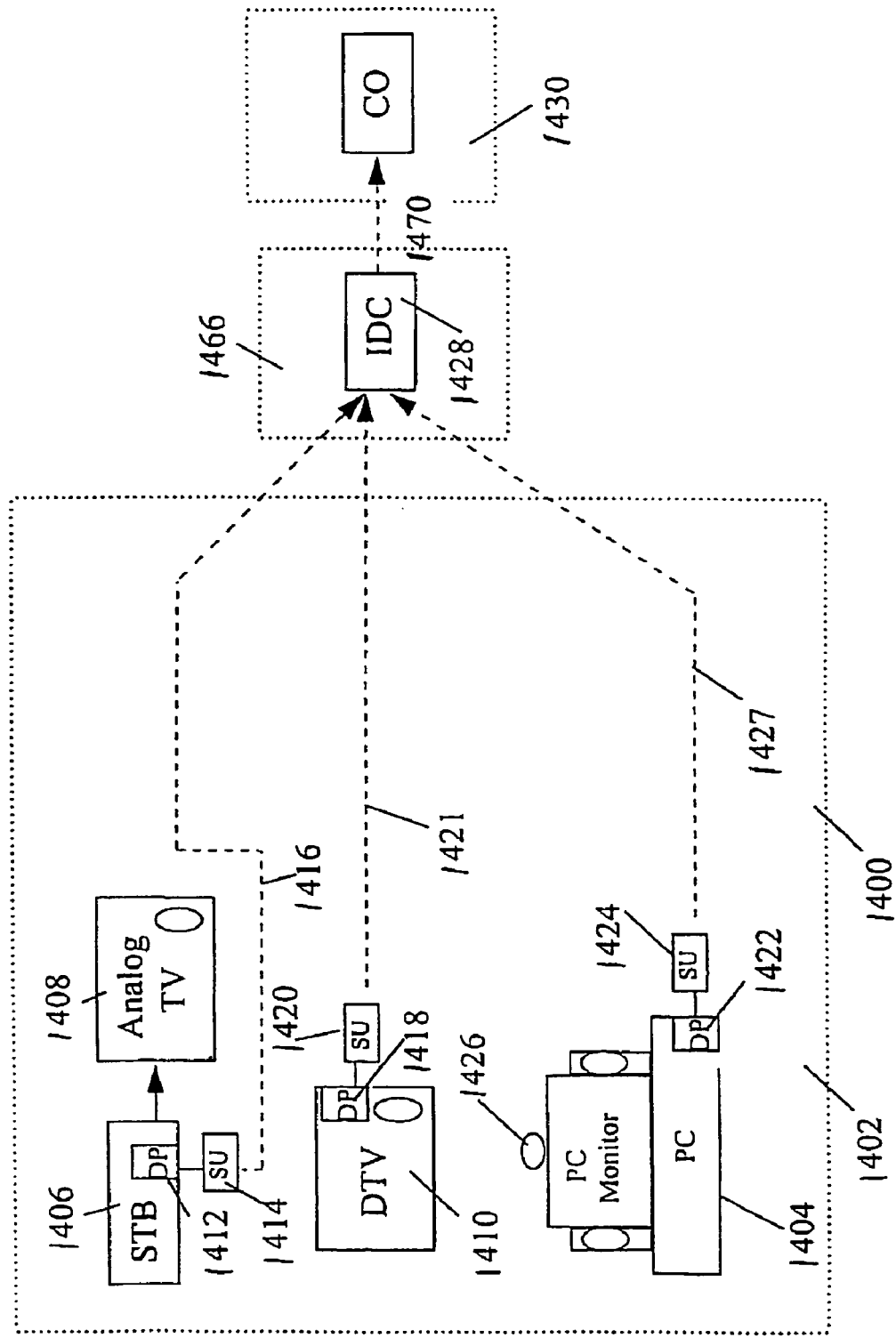
FIG. 10 is a schematic block diagram depicting a sixth example system employing the use of data ports on various television viewing equipment to monitor the reception of programs and content by broadcast receivers.

Accordingly, a sixth example system 1400 to monitor the reception of programs and content by broadcast receivers is provided as shown in FIG. 10. The example system 1400 measures tuning to digital television programming in connection with a statistically selected monitoring site 1402. The example system 1400 may include some or all of the features of the previously described example systems.

The example system 1400 permits tuning data, and possibly demographic data, to be collected from digital television reception equipment that includes (i) a personal computer 1404, (ii) a digital converter 1406, (iii) an analog television set 1408 operating in response to the digital converter 1406, and (v) a digital television set 1410.

The digital converter 1406 has a data port 1412. A site unit 1414 reads and stores the full ATSC bitstream, the analog or digital major channel selection, the program selection, vertical blanking interval data, and/or the like data available at the data port 1412 in order to determine the program selected for viewing on the analog television set 1408 as well as any other desired and available information. Moreover, the site unit 1414 may be arranged to collect demographic data related to the viewers in the audience of the program selected for viewing on the analog television set 1408. For example, the site unit 1414 may collect demographic data from a person identifier, a Peoplemeter, or the like, as discussed above. All such data may be uploaded over a communication medium 1416, which may be a wire, a power line, and IR link, an RF modem, or the like.

Similarly, the digital television set 1410 has a data port 1418. A site unit 1420 reads and stores the full major channel ATSC bitstream, the major channel selection, the program selection, physical source identification, and the like data available at the data port 1418 in order to determine the program selected for viewing on the digital television set 1410 as well as any other desired and available information. Moreover, the site unit 1420 may be arranged to collect demographic data related to the viewers in the audience of the program selected for viewing on the digital television set 1408. For example, the site unit 1420 may collect demographic data from a person identifier, a Peoplemeter, or the like, as discussed above. All such data may be uploaded over a communication medium 1421.

Also, the personal computer 1404 has a data port 1422. A site unit 1424 reads and stores the full major channel ATSC bitstream, the major channel selection, the program selection, and the like data available at the data port 1422 in order to determine the program selected for viewing on the personal computer 1404 as well as any other desired and available information. Moreover, a person identifier 1426 may be provided in order to identify the persons watching television programming on the personal computer 1404. As in the case of the person identifier 1098, the person identifier 1426 may be video camera, an IR camera, or the like, and may be provided with any or all of the viewing equipment shown in FIG. 10. All program and demographic data may be uploaded over a communication medium 1427.

The site units 1414, 1420, and 1424 may be telecommunication enabled so that television audience data from all the viewing sites in the statistically selected monitoring site 1402 can be communicated, via the Internet, a public telephone system, or the like, to a locally located or remotely located intermediate data collector 1428 and then to a remotely located central office 1430 through a communication channel 1470. The intermediate data collector 1428 can be flexibly located either at the same statistically selected monitoring site 1402, or at a remotely located site 1466, or at the central office 1430. For this purpose, the site units 1414, 1420, and 1424 may be provided with serial ports, parallel ports, universal serial buses (USB), firewires (according to IEEE 11394), or the like. The intermediate data collector 1428, for example, may be a computerized data collector or an Internet service provider. Alternatively, the intermediate data collector 1428 may be a home unit, in which case, the intermediate data collector 1428 may be located within the statistically selected monitoring site 1402 and may itself be arranged to communicate tuning and demographic data via e-mail or other communication to the central office 1430.

Figure 11:
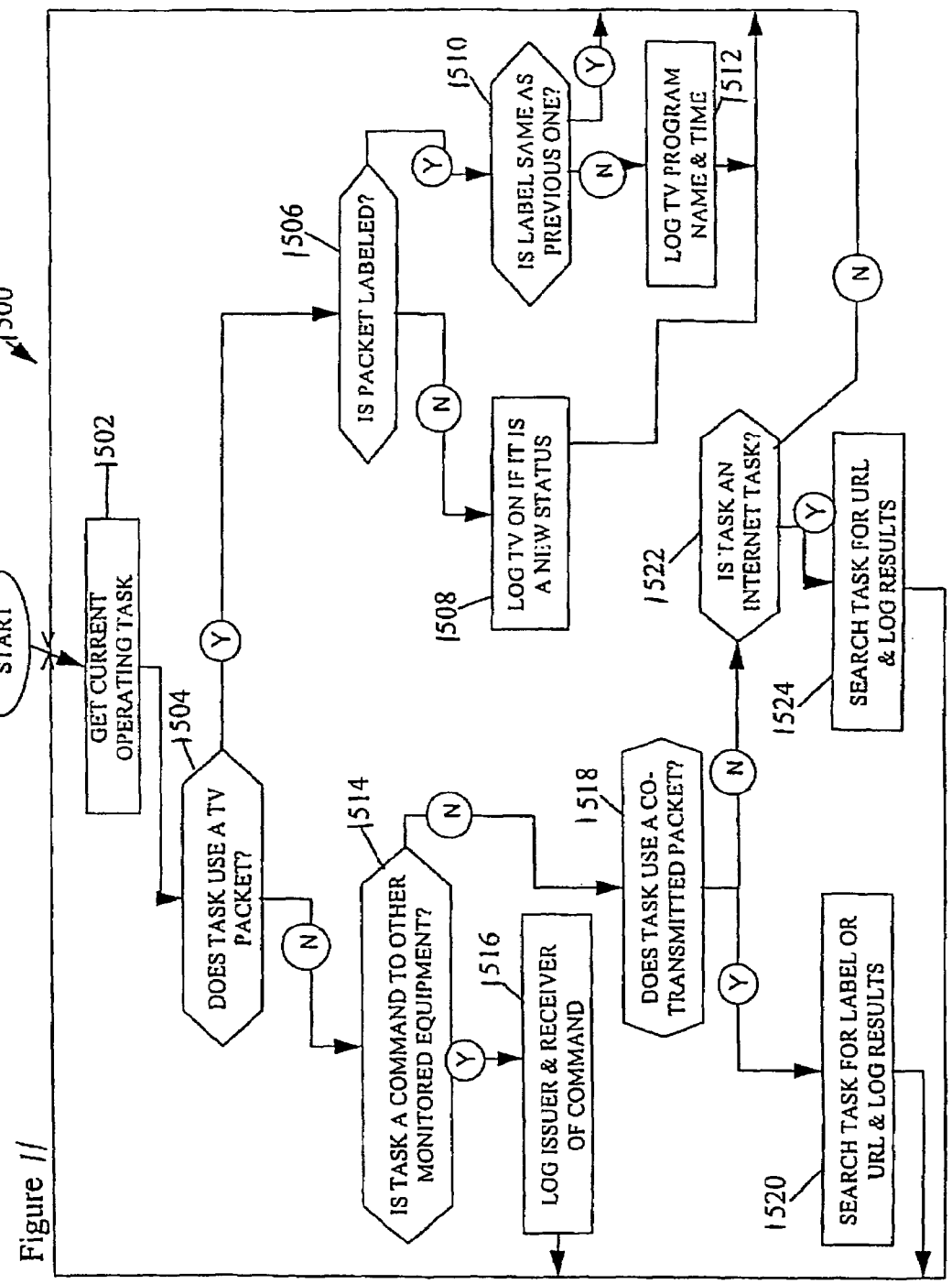
FIG. 11 is a flow chart depicting the operation of an example software agent for use in an example system to monitor the reception of programs and content by broadcast receivers.

An example software agent 1500 is shown in FIG. 11. The software agent 1500 can be used for any of the software agents 1112, 1118, and 1122. As shown at a block 1502 of the software agent 1500, the software agent 1500 copies the current operating task. If the current operating task uses a packet of television programming as determined at a block 1504, the software agent 1500 at a block 1506 determines whether the data packet has a decodable packet label including a decodable program identification code, name, or other indicia. This program identification data packet is expected to be a feature of digital television programming, particularly if multiple programs are packed simultaneously as minor channels in a broadcast channel in a digital broadcasting environment, and is expected to identify the program tuned by the monitored television.

If the data packet does not have a decodable packet label, the software agent 1500 at a block 1508 causes the ON state of the monitored viewing equipment to be logged, provided that this ON state is a new status for the monitored viewing equipment and the monitored viewing equipment is ON. The balance of the measurement system (e.g., the audio signal methods employed by any of the other example systems 1060, 1200, and 1300 described above) is relied on in order to identify the tuning. Program flow then returns to the block 1502 to await the next operating task.

On the other hand, if the data packet does have a decodable packet label, the software agent 1500 determines at a block 1510 whether the packet label from the data packet of the current operating task is the same as the packet label previously determined by the software agent 1500. If so, there is no need to store the packet label unless it is merely indicative of continued viewing to an already identified television program. Accordingly, program flow returns to the block 1502 to await the next operating task. However, if the packet label from the data packet of the current operating system task is not the same as the packet label previously determined at the block 1506, the software agent 1500 at a block 1512 logs the identification of the television program as contained in the program label and also logs the time. Program flow then returns to the block 1502 to await the next operating task.

If the current operating task does not use a packet of television programming as determined at a block 1504, the software agent 1500 at a block 1514 determines whether the current operating task is a command to other monitored equipment (e.g., a command to the digital television receiver 1110 to tune a different channel and to select a particular one of the N programs being broadcast in that channel). If the current operating task is a command to other monitored equipment, the software agent 1500 at a block 1516 logs as much detail as is available (e.g., the command itself, the identity of the issuer of the command, and the identity of the recipient of the command) in memory, and program flow returns to the block 1502.

If the current operating task is not a command to other monitored equipment, the software agent 1500 at a block 1518 determines if co-transmitted data (i.e., data that is related to one of the television programs being broadcast in a channel and that is transmitted during the same time interval as the program) has been selected by a viewer. Co-transmitted data may comprise a guide to other available television programming, catalog-like details on products being advertised on the co-transmitted program, and the like. Some of these proposed uses of co-transmitted data will be configured so that one can infer what program is being viewed from a URL or other label that logically links the co-transmitted data to the television program. Accordingly, the software agent 1500 at a block 1520 searches the header portion of a task for such URL or other label, and logs such URL or other label that is found. Thereafter, program flow returns to the block 1502.

If co-transmitted data has not been selected by a viewer, the software agent 1500 at a block 1522 determines if the user of the equipment has directed his or her browser, or other communication software, to access an internet page (assuming that the monitored viewing equipment being monitored is configured so that it has access to the Internet or other on-line service). If the user of the equipment has directed his or her browser, or other communication software, to access an internet page, the software agent 1500 at a block 1524 searches for a URL or other label, and logs such URL or other label that is found. Thereafter, program flow returns to the block 1502. If the user of the equipment has not directed his or her browser, or other communication software, to access an internet page, program flow returns to the block 1502.

As an example of the use of a software agent as describe above, consider the case of a person in a statistically selected monitoring site who is viewing a digital television program and who sees an interesting product being advertised. It is expected that the person will have the capability to request more data on that product by means of a simple mouse-click operation. This data, for example, will either be a subset of the data providing the displayed advertisement, or will be co-transmitted subsequently in the signal of the television program that the person has selected for viewing. This data would then be displayed in a separate window on the multi-windowed display being used for television viewing. An additional set of data could then be obtained by clicking on a hypertext link element of the initially displayed data. This action would result in downloading the desired additional data over the Internet. A software agent installed in this viewing equipment could thus log not only what program was being viewed, but could also supply additional marketing research data on the consumer's use of in-program advertising.

In addition to providing a device for monitoring tuning activity, the software agent of the present invention can be used to collect demographic data relative to the monitored viewing. In a manual approach to the collection of demographic data, the software agent could generate a status and prompting display in one window of the viewing equipment requiring a viewer or user to input the appropriate demographic data. This status and prompting display window could have an appearance similar to that provided by the peoplemeter hardware widely used in contemporary audience measurements and that displays a status reminder light for each occupant of a statistically selected monitoring site. However, in the comparable windowed display arrangement, the name of each occupant could be shown along with a status indicator.

If the software agent is used with a personal computer that can receive digital television programming, a variety of more nearly automatic and less intrusive approaches (from the television viewer's perspective) could be used to collect persons data and update a tiled status display. For example, it is well known to identify an individual user of a manual input device (such as a keyboard or a mouse) of a computer by the characteristic rates of data entry and pauses between data entries. In a television audience measurement, in which the occupant population to be monitored is very small, measurements of this sort should be expected to be highly accurate. Moreover, an increasing number of personal computers have video cameras associated with them, so that the user of the computer can engage in video conferences by telephone. When such equipment is available in a statistically selected monitoring site, a software agent comprising known head location and face recognition software (e.g., as taught by Lu in U.S. Pat. No. 4,858,000) can be employed for the identification persons and the collection of demographic data.

Certain modifications of the present invention have been discussed above. Other modifications will occur to those practicing in the art of the present invention. For example, the software agents 1112, 1118, and 1122, as described above, monitor operating tasks. The operating tasks may be operating system events of the operating systems used by the equipment in which the software agent is resident. Indeed, the software agents 1112, 1118, and 1122 may monitor any function of the monitored equipment as long as the desired data is collected.

Also, a statistically selected monitoring site according to each of the examples of the invention, as described above, includes certain viewing equipment as well as certain monitoring equipment. However, it should be understood that a statistically selected monitoring site according to the present invention may include any combination of the equipment incorporated in the examples described above, as well as other and/or different equipment.

Moreover, the software agent 1500 described above can be generic so that it can be used with any piece of equipment with which it is compatible, or it may be specialized for each particular apparatus in which it is used. Also, the software agent 1500 may be arranged to detect the all window activities conducted by an audience.

Furthermore, although not shown in FIGS. 6 through 9, the digital television reception equipment of the examples shown therein may further include auxiliary digital television equipment such as a VCR, a digital video disk player, a video game, or other entertainment systems.

Additionally, as described above, program identification codes are detected in order to identify television programs. However, television programs may be identified by any indicia such as program names. Moreover, an internet page may be identified by its address or by an identification code or name or label or, in the case of an advertisement on the Internet, by its banner. Therefore, any indicia from which a television program or content associated with a television program may be identified is referred to herein generically as an identification datum.

Moreover, the home units 1248 and/or 1346 may be referred to herein as intermediate data collectors.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for identifying a broadcast program tuned by a monitored digital receiver at a first location, wherein the broadcast program is one of a plurality of broadcast programs, and wherein each of the plurality of broadcast programs is transmitted as a sequence of data packets based on a digital protocol, the method comprising:
    determining, at the first location, a monitored signature representative of a monitored program signal providing the broadcast program tuned by the monitored digital receiver;
    determining, at the first location, a reference signature from a set of data packets corresponding to a reference broadcast program tuned by a reference receiver from the plurality of broadcast programs, the reference signature representative of a reference program signal providing the reference broadcast program tuned by the reference receiver;
    comparing, at the first location, the monitored signature and the reference signature; and
    only when the monitored signature and the reference signature substantially match, detecting, at the first location, an identifying code accompanying the reference broadcast program without using either of the monitored signature or the reference signature, the identifying code capable of identifying the broadcast program tuned by the monitored digital receiver and tuned by the reference receiver.

2. A method as defined in claim 1 further comprising storing the identifying code with a time stamp when the monitored signature and the reference signature substantially match.

3. A method as defined in claim 1 wherein the monitored signature comprises at least one of an audio portion or a video portion of the broadcast program.

4. A method as defined in claim 1 wherein the monitored signature comprises at least one of an audio signature generated from an audio portion of the broadcast program or a video signature generated from a video portion of the broadcast program.

5. A method as defined in claim 1 wherein the monitored signature is detected by a non-invasive sensor proximate to an output of the monitored digital receiver.

6. A method as defined in claim 5 wherein the non-invasive sensor is a microphone.

7. A method as defined in claim 1 wherein the reference signature comprises at least one of an audio portion or a video portion of the reference broadcast program.

8. A method as defined in claim 1 wherein the reference signature comprises at least one of an audio signature generated from an audio portion of the reference broadcast program or a video signature generated from a video portion of the reference broadcast program.

9. A method as defined in claim 1 wherein the reference signature comprises at least one of a set of audio components or a set of video components included in the set of data packets corresponding to the reference broadcast program.

10. A method as defined in claim 1 wherein the reference signature comprises at least one of a set of audio signatures generated from a set of audio components included in the set of data packets corresponding to the reference broadcast program or a set of video signatures generated from a set of video components included in the set of data packets corresponding to the reference broadcast program.

11. A method as defined in claim 1 wherein determining the reference signature comprises scanning a particular one of a plurality of broadcast channels used to carry the plurality of broadcast programs to obtain the set of data packets corresponding to a reference broadcast program.

12. A method as defined in claim 11 further comprising scanning to a next one of the plurality of broadcast channels to obtain a different set of data packets corresponding to a different reference broadcast program when the monitored signature and the reference signature substantially match do not substantially match.

13. A method as defined in claim 11 wherein each of the plurality of broadcast channels is configured to carry at least one broadcast program.

14. A method as defined in claim 11 wherein each of the plurality of broadcast channels is configured to carry a major channel comprising a plurality of minor channels.

15. A method as defined in claim 14 wherein at least one of the major channel or at least one of the minor channels is configured to carry at least one broadcast program.

16. A method as defined in claim 14 wherein scanning the plurality of broadcast channels comprises selecting the major channel and sequentially processing each of the plurality of minor channels.

17. A method as defined in claim 11 wherein scanning the plurality of broadcast channels comprises determining to which broadcast channel the monitored digital receiver is tuned.

18. A method as defined in claim 17 wherein determining to which broadcast channel the monitored digital receiver is tuned comprises measuring a local oscillator frequency of the monitored digital receiver.

19. A method as defined in claim 1 wherein determining the reference signature comprises determining a broadcast channel to which the monitored digital receiver is tuned and receiving the reference broadcast program carried by the broadcast channel.

20. A method as defined in claim 19 wherein determining the broadcast channel to which the monitored digital receiver is tuned comprises measuring a local oscillator frequency of the monitored digital receiver.

21. A method as defined in claim 1 wherein the identifying code comprises program information included in the set of data packets corresponding to the reference broadcast program.

22. A method as defined in claim 21 wherein the program information conforms to the digital protocol used to transmit the plurality of broadcast programs such that the program information is required to process the set of data packets to receive the reference broadcast program.

23. A method as defined in claim 1 further comprising extracting the identifying code from the set of data packets corresponding to the reference broadcast program.

24. A method as defined in claim 23 wherein extracting the identifying code from the set of data packets corresponding to the reference broadcast program is performed only when the monitored signature and the reference signature substantially match.

25. A method as defined in claim 1 wherein the digital protocol used to transmit the plurality of broadcast programs at least one of does not include or corrupts ancillary coded program information.

26. A method as defined in claim 1 wherein the digital protocol used to transmit the plurality of broadcast programs conforms to an Advanced Television System Committee (ATSC) digital broadcast standard.

27. A method as defined in claim 1 wherein the digital protocol used to transmit the plurality of broadcast programs conforms to a digital video broadcast standard.

28. A method as defined in claim 1 wherein the monitored signature does not include the identifying code.

29. A system to identify a broadcast program tuned by a monitored digital receiver, wherein the broadcast program is one of a plurality of broadcast programs, and wherein each of the plurality of broadcast programs is transmitted as a sequence of data packets based on a digital protocol, the system comprising:
a first signal processor configured to determine a monitored signature representative of a monitored program signal providing the broadcast program tuned by the monitored digital receiver;
a second signal processor configured to determine a reference signature from a set of data packets corresponding to a reference broadcast program tuned by a reference receiver from the plurality of broadcast programs, the reference signature representative of a reference program signal providing the reference broadcast program tuned by the reference receiver;
a comparator configured to compare the monitored signature and the reference signature, wherein the comparator is configured to associate an identifying code detected from the reference program signal tuned by the reference receiver with the broadcast program tuned by the monitored digital receiver only when the monitored signature substantially matches the reference signature, the identifying code is included in the reference program signal in addition to the reference broadcast program and is not detectable from the monitored and reference signatures, and the identifying code is not detectable from a non-invasive sensor configured to detect an output of the monitored digital receiver; and
the second signal processor and the comparator cooperating to respectively determine reference signatures for different reference programs and compare the monitored signature to respective ones of the reference signatures until a substantial match is detected.

30. A system a defined in claim 29 further comprising a memory configured to store the identifying code with a time stamp when the comparator associates the identifying code with the broadcast program tuned by the monitored digital receiver.

31. A system as defined in claim 29 wherein the first signal processor comprises a non-invasive sensor configured to detect an output of the monitored digital receiver.

32. A system as defined in claim 29 wherein the first signal processor comprises a signature generator configured to generate a signature representative of an output of the monitored digital receiver.

33. A system as defined in claim 29 wherein the second signal processor is configured to extract at least one of a set of audio components or a set of video components included in the set of data packets corresponding to the reference broadcast program.

34. A system as defined in claim 29 wherein the second signal processor comprises a signature generator configured to generate at least one of a set of audio signatures generated from a set of audio components included in the set of data packets corresponding to the reference broadcast program or a set of video signatures generated from a set of video components included in the set of data packets corresponding to the reference broadcast program.

35. A system as defined in claim 29 further comprising a frequency probe configured to provide a local oscillator source for the second signal processor to use to tune to a broadcast channel to which the monitored digital receiver is tuned.

36. A system as defined in claim 29 wherein the identifying code comprises program information included in the set of data packets corresponding to the reference broadcast program.

37. A system as defined in claim 36 wherein the program information conforms to the digital protocol used to transmit the plurality of broadcast programs such that the program information is required to process the set of data packets to receive the reference broadcast program.

38. A system as defined in claim 29 further comprising a program information processor configured to extract the identifying code from the set of data packets corresponding to the reference broadcast program.

39. A system as defined in claim 38 wherein the program information processor is configured to extract the identifying code from the set of data packets corresponding to the reference broadcast program only when the monitored signature and the reference signature substantially match.

40. A system for identifying a program tuned by a monitored receiver, wherein the monitored receiver is located in a household, and wherein the system comprises:
a source tuner, separate from a tuner of the monitored receiver, arranged to tune to programs tunable by the monitored receiver, wherein the source tuner is located in the household;
a program signature extractor in communication with the monitored receiver and the source tuner and arranged to extract a first program signature representative of a characteristic of a first program signal provided by an output of the monitored receiver and to extract a second program signature representative of a characteristic of a second program signal provided by an output of the source tuner, the signature extractor located in the household;
a signature correlator located in the household and arranged to correlate the first and second program signatures; and
a code reader located in the household, in communication with the source tuner and arranged to read a code included with the program and different from the first and second program signatures only when the signature correlator detects a match between the first and second program signatures, the is code not detectable from either the first or the second program signatures.

* * * * *

UNITED STATES PATENT AND TRADEMARK OFFICE
CERTIFICATE OF CORRECTION

PATENT NO. : 7,587,728 B2
APPLICATION NO. : 11/339269
DATED : September 8, 2009
INVENTOR(S) : Wheeler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this

Twenty-first Day of September, 2010

David J. Kappos
*Director of the United States Patent and Trademark Office*